US011870102B1

(12) United States Patent
Zhou et al.

(10) Patent No.: US 11,870,102 B1
(45) Date of Patent: Jan. 9, 2024

(54) ENERGY STORAGE DEVICE AND ELECTRONIC DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wenyang Zhou, Guangdong (CN); Yongfeng Xiong, Guangdong (CN); Ming Yang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/204,061

(22) Filed: May 31, 2023

(30) Foreign Application Priority Data

Nov. 11, 2022 (CN) .......................... 202211416112.6

(51) Int. Cl.
*H01M 50/538* (2021.01)
*H01M 50/593* (2021.01)
(Continued)

(52) U.S. Cl.
CPC ....... *H01M 50/538* (2021.01); *H01M 10/052* (2013.01); *H01M 10/0587* (2013.01);
(Continued)

(58) Field of Classification Search
CPC ............. H01M 50/538; H01M 50/597; H01M 50/593; H01M 10/052; H01M 10/0587; H01M 10/44
See application file for complete search history.

(56) References Cited

U.S. PATENT DOCUMENTS

2008/0233474 A1* 9/2008 Son ................. H01M 50/147
429/185
2008/0268344 A1* 10/2008 Kim ................ H01M 50/55
429/246
(Continued)

FOREIGN PATENT DOCUMENTS

CN 208078103 U 11/2018
CN 211789330 U 10/2020
(Continued)

OTHER PUBLICATIONS

CNIPA, Office Action for Chinese Patent Application No. 202211416112.6, dated Jan. 13, 2023, 25 pages.
(Continued)

*Primary Examiner* — Kenneth J Douyette
(74) *Attorney, Agent, or Firm* — IP Spring

(57) ABSTRACT

An energy storage device and an electric device are provided in the disclosure. The energy storage device includes a jelly roll assembly and a connector. The jelly roll assembly includes at least one jelly roll. Each of the at least one jelly roll has multiple tabs arranged in a thickness direction of the tabs after winding an electrode sheet. The jelly roll has a first side surface and a first end surface. The multiple tabs are bent at roots of the multiple tabs and attached to the first end surface. The multiple tabs have a connection surface away from the first end surface. The connector is disposed on the connection surface and connected with the multiple tabs. The jelly roll assembly further includes a first insulation patch. The first insulation patch adheres to and covers a surface of the connector away from the first end surface, and extends to the first side surface.

20 Claims, 8 Drawing Sheets

(51) Int. Cl.
*H01M 50/597* (2021.01)
*H01M 10/052* (2010.01)
*H01M 10/44* (2006.01)
*H01M 10/0587* (2010.01)

(52) U.S. Cl.
CPC ......... *H01M 10/44* (2013.01); *H01M 50/593* (2021.01); *H01M 50/597* (2021.01)

(56) References Cited

U.S. PATENT DOCUMENTS

2014/0141338 A1* 5/2014 Kim .................... H01M 50/121
                                                                          429/246
2017/0141427 A1* 5/2017 Cho ....................... H01M 50/14
2017/0244129 A1* 8/2017 Seong ............... H01M 10/0431

FOREIGN PATENT DOCUMENTS

| CN | 213601987 U | 7/2021 |
| CN | 217589313 U | 10/2022 |
| CN | 217641690 U | 10/2022 |

OTHER PUBLICATIONS

CNIPA, Notification to Grant Patent Right for Invention for Chinese Patent Application No. 202211416112.6, dated Feb. 6, 2023, 3 pages.

* cited by examiner

ENERGY STORAGE DEVICE AND ELECTRONIC DEVICE

TECHNICAL FIELD

This application claims priority under 35 U.S.C. § 119(a) to and the benefit of Chinese Patent Application No. 202211416112.6, filed Nov. 11, 2022, the entire disclosure of which is incorporated herein by reference.

BACKGROUND

In the process of producing a lithium battery, a positive electrode sheet, a separator and a negative electrode sheet need to be stacked and wound to form a jelly roll, and then two or more jelly rolls are connected in series or in parallel to obtain a battery. After the jelly roll is wound, tabs of the jelly roll need to be soldered. However, after tab soldering of the existing jelly roll, soldering residues are easy to fall into the jelly roll to cause internal short circuit, which may pose risks during use, and shorten the battery life.

SUMMARY

An energy storage device and an electronic device are provided in the disclosure to address technical problems of internal short circuit in jelly roll assemblies and shortened service life caused by such internal short circuit.

In a first aspect, an energy storage device is provided. The energy storage device includes a jelly roll assembly and a connector. The jelly roll assembly includes at least one jelly roll. Each of the at least one jelly roll is formed by winding an electrode sheet. The electrode sheet includes multiple tabs. The multiple tabs are arranged in a thickness direction of the tabs after winding the electrode sheet. After the winding, the jelly roll has a first side surface and a first end surface connected with the first side surface, the multiple tabs are bent at roots of the multiple tabs and attached to the first end surface. The multiple tabs have a connection surface away from the first end surface. The connector is disposed on the connection surface and connected with the multiple tabs. The jelly roll assembly further includes a first insulation patch. The first insulation patch adheres to and covers a surface of the connector away from the first end surface, and is bent and extends to the first side surface. Under full charge/full discharge cycle at 1 current (C) and 25° C., when a discharge capacity of the energy storage device in which the first insulation patch is attached is attenuated to 90% of a rated capacity of the energy storage device, a cycle number of the energy storage device is equal to or larger than 500, and when the discharge capacity of the energy storage device is attenuated to 80% of the rated capacity, the cycle number of the energy storage device is equal to or larger than 1200.

Thus, in the disclosure, since the first insulation patch adheres to and covers the connector and extends to the first side surface, the first insulation patch may cover the connector and the tab to the maximum extent. Even if there are soldering residues falling from the connector and the tab, the first insulation patch may stick the soldering residues and prevent the soldering residues from entering a jelly roll pack, thus improving the security of the energy storage device. Furthermore, when a discharge capacity of the energy storage device in which the first insulation patch is attached is attenuated to 90% of a rated capacity of the energy storage device, a cycle number of the energy storage device is equal to or larger than 500, and when the discharge capacity of the energy storage device is attenuated to 80% of the rated capacity, the cycle number of the energy storage device is equal to or larger than 1200. In contrast, when a discharge capacity of the energy storage device in which no first insulation patch is attached is attenuated to 90% of the rated capacity of the energy storage device, a cycle number of the energy storage device is equal to or larger than 500, but when the discharge capacity of the energy storage device in which no first insulation patch is attached is attenuated to 80% of the rated capacity, the cycle number of the energy storage device is equal to or less than 1200. Therefore, it is proved by experiments that, with the first insulation patch, the service life of the energy storage device can by prolonged.

In a possible implementation, the electrode sheet includes a first electrode sheet and a second electrode sheet. Each of the at least one jelly roll is formed by winding the first electrode sheet and the second electrode sheet. The first electrode sheet includes multiple first tabs, the second electrode sheet includes multiple second tabs, the multiple first tabs are arranged in a thickness direction of the multiple first tabs after the winding, and the multiple second tabs are arranged in a thickness direction of the multiple second tabs after the winding, and a polarity of the multiple first tabs is opposite to a polarity of the multiple second tabs. The connector includes a first connector and a second connector. The multiple first tabs have a first connection surface away from the first end surface. The first connector is disposed on the first connection surface and is connected with the multiple first tabs. The multiple second tabs have a second connection surface away from the first end surface. The second connector is disposed on the second connection surface and is connected with the multiple second tabs. The first insulation patch includes a first insulation sub-patch and a second insulation sub-patch. The first insulation sub-patch adheres to and covers a surface of the first connector away from the first end surface and extends to the first side surface, and the second insulation sub-patch adheres to and covers a surface of the second connector away from the first end surface and extends to the first side surface.

Accordingly, the first connector is disposed on each of the multiple first tabs, and the first insulation sub-patch is disposed on the first connector. The first insulation sub-patch may extend from a position above the first end surface, that is, the first insulation sub-patch may extend from a surface of the first connector away from the first end surface to the first side surface. In this way, a solder zone between the first tab and the first connector may be fully covered by the first insulation sub-patch, which prevents soldering residues in the solder zone, which may fall off in day-to-day use, from entering the jelly roll pack, thereby avoiding short circuit caused by the soldering residues. In addition, the soldering residues that fall off are prevented from being corroded to form metal ions by the electrolyte, where the metal ions may be precipitated on the surface of the negative electrode sheet of the electrode sheet along charging/discharging cycles and gradually penetrate the separator between the positive electrode sheet and the negative electrode sheet of the electrode sheet to cause short circuit. Similarly, the second connector is disposed on each of the multiple second tabs, and the second insulation sub-patch is disposed on the second connector. The second insulation sub-patch may extend from a position above the first end surface, that is, the second insulation sub-patch may extend from a surface of the second connector away from the first end surface to the first side surface. In this way, a solder zone between the second tab and the second connector may be fully covered by the second insulation sub-patch. Thus, it is possible to avoid a problem that the service life of the energy storage device is shortened due to short circuit that is caused by soldering residues that fall off, and the service life of the energy storage device can be prolonged.

In a possible implementation, the first insulation sub-patch includes a first connection sub-portion and a second connection sub-portion connected with the first connection sub-portion. The first connection sub-portion adheres to an upper side of the first end surface, and the second connection sub-portion is bent downwards relative to the first connection sub-portion and adheres to the first side surface. In a width direction of the at least one jelly roll, the first connection sub-portion exceeds an edge of the first connector by a distance greater than or equal to 2 mm. A length of the second sub-connection portion in a height direction of the at least one jelly roll is greater than or equal to 2 mm. The second insulation sub-patch includes a third connection sub-portion and a fourth connection sub-portion connected with the third connection sub-portion. The third connection sub-portion adheres to the upper side of the first end surface, and the fourth connection sub-portion is bent downwards relative to the third connection sub-portion and adheres to the first side surface. In the width direction of the at least one jelly roll, the third connection sub-portion exceeds an edge of the second connector by a distance greater than or equal to 2 mm, and a length of the fourth connection sub-portion in the height direction of the at least one jelly roll is greater than or equal to 2 mm.

In this way, the first insulation sub-patch has a reliable and stable connection with the jelly roll and the first connector. Even if the jelly roll assembly is soaked in the electrolyte for a long time and any soldering residue falls off and sticks to a surface of the first insulation sub-patch, a connection reliability between the first insulation sub-patch and the jelly roll and the first connector may not be affected. The second insulation sub-patch has a reliable and stable connection with the jelly roll and the second connector. Even if the jelly roll assembly is soaked in the electrolyte for a long time and any soldering residue falls off and sticks to a surface of the second insulation sub-patch, a connection reliability between the second insulation sub-patch and the jelly roll and the second connector may not be affected.

In a possible implementation, the first insulation sub-patch has an elongation at break of 120%-140% at a bending connection region between the first connection sub-portion and the second connection sub-portion when subject to an expansion force of the at least one jelly roll, and the second insulation sub-patch has an elongation at break of 120%-140% at a bending connection region between the third connection sub-portion and the fourth connection sub-portion when subject to the expansion force of the at least one jelly roll.

Thus, in the case where the energy storage device adheres to the first insulation sub-patch and the second insulation sub-patch, the first insulation sub-patch and the second insulation sub-patch may also counteract the expansion force of the jelly roll during charging and discharging. In other words, the first insulation sub-patch and the second insulation sub-patch may also serve to restrain an expansion of the jelly roll during charging and discharging. As such, a flatness of the jelly roll can be maintained during charging and discharging, the electrolyte can have a better entry effect, and lithium plating can be reduced. Thus, a cycle number of charging and discharging of the energy storage device can be increased, that is, the service life of the energy storage device can be prolonged.

In a possible implementation, the first insulation sub-patch has a deformation ratio of 0-20% at a bending connection region between the first connection sub-portion and the second connection sub-portion when subject to an expansion force of the at least one jelly roll, and the second insulation sub-patch has a deformation ratio of 0-20% at a bending connection region between the third connection sub-portion and the fourth connection sub-portion when subject to the expansion force of the at least one jelly roll. As such, the deformation rate of the first insulation sub-patch and the deformation rate of the second insulation sub-patch can be controlled within a range of 0-20% to prevent fractures of the first insulation sub-patch and the second insulation sub-patch caused by the expansion force of the jelly roll. The first insulation sub-patch and the second insulation sub-patch may also be prevented from being excessively stretched, where excessive stretching of the first insulation sub-patch and the second insulation sub-patch may cause local thinning and reduced insulation performance of the first insulation sub-patch and the second insulation sub-patch, which may adversely affect the cycling performance of the energy storage device.

In a possible implementation, the at least one jelly roll further has a second side surface opposite the first side surface. The multiple tabs have an attachment surface close to the first end surface, the jelly roll assembly further includes a second insulation patch. The second insulation patch adheres to and covers the attachment surface and extends to the first end surface and the second side surface.

Thus, the second insulation patch adheres to and covers the attachment surface and extends to the first end surface and the second side surface, which can ensure that the attachment surface of the tab may be fully covered, preventing any soldering residue or impurities on the attachment surface of the tab from falling off. Furthermore, the second insulation patch also extends to the first end surface and the second side surface, so that connection reliability among the insulation patch, the tab, the first end surface, and the second side surface can be significantly increased, and no part may fall off even if the jelly roll is soaked in the electrolyte for a long time.

In a possible implementation, the electrode sheet includes a first electrode sheet and a second electrode sheet, each of the at least one jelly roll is formed by winding the first electrode sheet and the second electrode sheet. The first electrode sheet includes multiple first tabs, the second electrode sheet includes multiple second tabs, the multiple first tabs are arranged in a thickness direction of the multiple first tabs after the winding, the multiple second tabs are arranged in a thickness direction of the multiple second tabs after the winding, and a polarity of the multiple first tabs is opposite to a polarity of the multiple second tabs. The multiple first tabs have a first attachment surface close to the first end surface, and the multiple second tabs have a second attachment surface close to the first end surface. The second insulation patch includes a third insulation sub-patch and a fourth insulation sub-patch. The third insulation sub-patch adheres to and covers the first attachment surface and extends to the first end surface and the second side surface, and the fourth insulation sub-patch adheres to and covers the second attachment surface and extends to the first end surface and the second side surface.

Thus, the first attachment surface of the first tabs is covered by the third insulation sub-patch, so that the first attachment surface of the first tab can be effectively protected, preventing soldering residues on the first tab from falling off to a maximum extent. The third insulation sub-patch may further extend to the first end surface and the second side surface, so that connection reliability among the third insulation sub-patch, the first tab, the first end surface, and the second side surface can be significantly increased, and no part may fall off even if the jelly roll is soaked in the electrolyte for a long time, thereby increasing the connection reliability. The second attachment surface of the second tabs is covered by the fourth insulation sub-patch, so that the second attachment surface of the second tab can be effectively protected, preventing soldering residues on the second tab from falling off to a maximum extent. The fourth insulation sub-patch also extends to the first end surface and the second side surface, so that the connection reliability among the fourth insulation sub-patch, the second tab, the first end surface, and the second side surface can be significantly increased, and no part may fall off even if the jelly roll is soaked in the electrolyte for a long time, thereby increasing the connection reliability.

In a possible implementation, in a width direction of the at least one jelly roll, the third insulation sub-patch exceeds an edge of the first attachment surface by a distance greater than or equal to 2 mm. In the width direction of the at least one jelly roll, the fourth insulation sub-patch exceeds an edge of the second attachment surface by a distance greater than or equal to 2 mm. In a possible implementation, in a height direction of the at least one jelly roll, the third insulation sub-patch extends on the second side surface by a distance greater than or equal to 2 mm. In the height direction of the at least one jelly roll, the fourth insulation sub-patch extends on the second side surface by a distance greater than or equal to 2 mm.

Thus, the third insulation sub-patch has a reliable and stable connection with the jelly roll. Even if the jelly roll assembly is soaked in the electrolyte for a long time and any soldering residue falls off and sticks to a surface of the third insulation sub-patch, a connection reliability between the third insulation sub-patch and the jelly roll may not be affected. The fourth insulation sub-patch has a reliable and stable connection with the jelly roll. Even if the jelly roll assembly is soaked in the electrolyte for a long time and any soldering residue falls off and sticks to a surface of the fourth insulation sub-patch, a connection reliability between the fourth insulation sub-patch and the jelly roll may not be affected.

In a possible implementation, the at least one jelly roll is provided with a tail portion on the first side surface, the jelly roll assembly further includes a tail insulation patch, and the tail insulation patch adheres to and covers the first side surface and the tail portion.

Thus, the tail insulation patch adheres to the first side surface and covers the tail portion of an outer jelly roll, and can counteract a tension force applied on the tail portion caused by the expansion of the jelly roll during charging and discharging.

In a possible implementation, the at least one jelly roll is provided with a tail portion on the first side surface, the jelly roll assembly further includes a tail insulation patch, the tail insulation patch adheres to and covers the first side surface and the tail portion, and the tail insulation patch is between the first insulation sub-patch and the second insulation sub-patch.

Thus, the tail insulation patch, the first insulation sub-patch, and the second insulation sub-patch respectively cover different regions of the first side surface, and thus provide corresponding adhesive forces for different regions to counteract the expansion force of the at least one jelly roll during charging and discharging.

In a possible implementation, the tail insulation patch at least partially covers and adheres to at least one of the first insulation sub-patch or the second insulation sub-patch.

Thus, at least one of the first insulation sub-patch or the second insulation sub-patch partially overlaps the tail insulation patch to further enhance adhesion, thereby increasing the adhesion stability between the first insulation sub-patch and the tail insulation patch and the adhesion stability between the second insulation sub-patch and the tail insulation patch. Even if the at least one jelly roll is soaked in the electrolyte for a long time in practical use, the first insulation sub-patch and the second insulation sub-patch may not be separated from the jelly roll or upwarp, thereby significantly improving the use stability of the energy storage device.

In a possible implementation, the at least one jelly roll further has a second side surface opposite the first side surface. The at least one jelly roll further has a third side surface, a fourth side surface opposite the third side surface, and a second end surface opposite the first end surface. The first end surface is connected with one side of the first side surface, one side of the second side surface, one side of the third side surface, and one side of the fourth side surface. The second end surface is connected with the other side of the first side surface, the other side of the second side surface, the other side of the third side surface, and the other side of the fourth side surface. The first side surface and the second side surface each have a greater area than the third side surface, the fourth side surface, the first end surface, and the second end surface. The jelly roll assembly further includes bundling insulation patches disposed on the third side surface, the fourth side surface, and the second end surface. In the case where the at least one jelly roll abuts against one another at one of the second side surface or the first side surface, two ends of each of the bundling insulation patches respectively extend to the other one of the first side surface or the second side surface of the at least one jelly roll that is exposed. Under full charge/full discharge cycle at 1 C and 25° C., when the discharge capacity of the energy storage device in which the bundling insulation patches and the first insulation patch are attached is attenuated to 90% of the rated capacity, the cycle number of the energy storage device is equal to or larger than 900, and when the discharge capacity of the energy storage device in which the bundling insulation patches and the first insulation patch are attached is attenuated to 80% of the rated capacity, the cycle number of the energy storage device is equal to or larger than 1500.

Thus, since the electrode sheet of the energy storage device may expand during charging and discharging, wrinkles may appear, and impregnation of the electrolyte at the wrinkles is difficult, which easily results in lithium plating and reduces the cycle number. The expansion of the electrode sheet can be effectively restrained by the bundling insulation patches, so that the electrode sheet can maintain a good fitting interface, thereby prolonging the service life. Experiences show that, under full charge/full discharge cycle at 1 C and 25° C., when the discharge capacity of the energy storage device in which the bundling insulation patches are attached is attenuated to 90% of the rated capacity, the cycle number of the energy storage device is equal to or larger than 900, and when the discharge capacity of the energy storage device in which the bundling insulation patches are attached is attenuated to 80% of the rated capacity, the cycle number of the energy storage device is equal to or less than 1500. Under full charge/full discharge cycle at 1 C and 25° C., when the discharge capacity of the energy storage device in which both the bundling insulation patches and the first insulation patch are attached is attenuated to 90% of the rated capacity, the cycle number of the energy storage device is equal to or larger than 900, and when the discharge capacity of the energy storage device in which both the bundling insulation patches and the first insulation patch are attached is attenuated to 80% of the rated capacity, the cycle number of the energy storage device is equal to or larger than 1500. With either the first insulation patch or the bundling insulation patches alone, the service life of the energy storage device can be prolonged. Moreover, with the aid of both the bundling insulation patches and the first insulation patch, the service life of the energy storage device can be further prolonged.

In a possible implementation, the at least one jelly roll includes two jelly rolls. The two jelly rolls abut against each other at two second side surfaces, and the bundling insulation patches include a first bundling insulation patch, a second bundling insulation patch, a third bundling insulation patch, and a fourth bundling insulation patch. The first bundling insulation patch is disposed on the third side surface and has two ends respectively extending from the third side surface to two first side surfaces that are exposed, and the second bundling insulation patch is disposed on the fourth side surface and has two ends respectively extending from the fourth side surface to the two first side surfaces that are exposed. The third bundling insulation patch and the fourth bundling insulation patch are disposed on the second end surface at an interval. The third bundling insulation patch has two ends respectively extending from the second end surface to the two first side surfaces that are exposed, and the fourth bundling insulation patch has two ends respectively extending from the second end surface to the two first side surfaces that are exposed. The first bundling insulation patch and the second bundling insulation patch are symmetrically arranged about a central line of the at least one jelly roll, and the third bundling insulation patch and the fourth bundling insulation patch are symmetrically arranged about the central line of the at least one jelly roll.

Thus, the first bundling insulation patch is disposed on the third side surface of the jelly roll pack, the second bundling insulation patch is disposed on the fourth side surface of the jelly roll, and the third bundling insulation patch and the fourth bundling insulation patch are disposed on the second end surface of the jelly roll, so that a more secure and balanced bundling can be achieved, thereby effectively restraining the expansion of the electrode sheet, maintaining a good fitting interface, and prolonging the service life.

In a possible implementation, a ratio of a tensile force that the bundling insulation patches are able to withstand to an adhering area of the bundling insulation patch on the at least one jelly roll is greater than an expansion-force pressure of the at least one jelly roll. The expansion-force pressure of the at least one jelly roll is less than or equal to 0.4 MPa.

Thus, the ratio of the tensile force that the bundling insulation patches are able to withstand to the adhering area of the bundling insulation patches on the at least one jelly roll is greater than the expansion-force pressure of the at least one jelly roll, where the expansion-force pressure of the at least one jelly roll is less than or equal to 0.4 MPa. When the at least one jelly roll expands during charging and discharging, the bundling insulation patches apply a pre-tightening force to restrain the expansion, so that an adhesion between the separator and the negative electrode sheet is better, which can prevent the separator and the negative electrode sheet from moving apart and forming wrinkles as a result of the expansion, thereby improving the entry effect of the electrolyte, reducing lithium plating, and prolonging the service life.

In a possible implementation, the first connector has a first connection region and a second connection region. The first connection region is connected with the multiple first tabs, and the first insulation sub-patch covers the first connection region and the second connection region is exposed. The second connector has a third connection region and a fourth connection region. The third connection region is connected with the multiple second tabs, and the second insulation sub-patch covers the third connection region and the fourth connection region is exposed.

Thus, the second connection region is configured to be connected with a first pole, and the fourth connection region is configured to be connected with a second pole. Since the first insulation sub-patch covers the one side of the first connection region away from the first end surface and the second connection region is exposed, it is convenient for the second connection region to be soldered to the first pole. Since the second insulation sub-patch covers the one side of the third connection region away from the first end surface and the fourth connection region is exposed, it is convenient for the fourth connection region to be soldered with the second pole.

In a possible implementation, the jelly roll assembly further includes a third insulation patch and a fourth insulation patch. The third insulation patch adheres to and covers one side of the second connection region facing the first end surface, and the fourth insulation patch adheres to and covers one side of the fourth connection region facing the first end surface.

Thus, the third insulation patch can prevent soldering residues generated during a soldering of the first pole from falling off, and the fourth insulation patch can prevent soldering residues generated during a soldering of the second pole from falling off. Thus, soldering residues generated during soldering of the first pole and the second pole can be prevented from falling into the jelly roll, where soldering residues may cause problems such as short circuit, thereby affecting the service life of the energy storage device.

In a possible implementation, the third insulation patch extends from the second connection region to cover the first connection region and partially overlaps the third insulation sub-patch. The fourth insulation patch extends from the fourth connection region to cover the third connection region and partially overlaps the fourth insulation sub-patch.

Thus, the third insulation patch can sufficiently protect the second connection region, and the third insulation patch partially overlaps and adheres to the third insulation sub-patch. The connection reliability of the third insulation patch and the connection reliability of the third insulation sub-patch can be enhanced. Even if the jelly roll is soaked in the electrolyte for a long time, the third insulation patch may not be separated from the second connection region, and the third insulation sub-patch may not be separated from the first connection region, and the third insulation patch and the third insulation sub-patch may be not separated from each other, thereby improving the connection stability. The fourth insulation patch may sufficiently protect the fourth connection region, and the third connection region may partially overlap and adheres to the fourth insulation sub-patch. The connection reliability of the fourth insulation patch and the connection reliability of the fourth insulation sub-patch can be enhanced. Even if the jelly roll is soaked in the electrolyte for a long time, the fourth insulation patch may not be separated from the fourth connection region, the fourth insulation sub-patch may not be separated from the third connection region, and the fourth insulation patch may not be separated from the fourth insulation sub-patch.

In a possible implementation, the energy storage device further includes a casing and a cover plate. The casing defines an opening at one side of the casing, the jelly roll assembly is received in the casing, and the connector is disposed on one side of the cover plate facing the casing. The cover plate covers the opening of the casing to define an accommodating space, and the jelly roll assembly and the connector are accommodated in the accommodating space.

By connecting with the cover plate through the connector, the connection is stable and reliable.

In a second aspect, an electric device is further provided in the disclosure. The electric device includes the energy storage device in the first aspect, and the energy storage device is configured for providing electric energy.

Thus, for the energy storage device of the disclosure that is used for the electric device, when soldering residues fall into the jelly roll, the soldering residues that fall off may cause short circuit. In addition, the soldering residues that fall off may be corroded by an electrolyte to form metal ions, where the metal ions may be precipitated on a surface of a negative electrode sheet of the electrode sheet along charging/discharging cycles, and gradually penetrate a separator between a positive electrode sheet and the negative electrode sheet of the electrode sheet to cause short circuit. Since the first insulation patch adheres to and covers the connector and extends to the first side surface, the first insulation patch may cover the connector and the tab to the maximum extent. Even if there are soldering residues falling from the connector and the tab, the insulation patch may stick the soldering residues and prevent the soldering residues from entering the jelly roll, thus improving the security of the energy storage device, and prolonging the service life of the energy storage device.

BRIEF DESCRIPTION OF THE DRAWINGS

In order to describe technical solutions of implementations of the disclosure more clearly, the following will give a brief introduction to accompanying drawings used for describing the implementations. Obviously, the accompanying drawings hereinafter described are some implementations of the disclosure. Based on these drawings, those of ordinary skill in the art can also obtain other drawings without creative effort.

Figure 1:
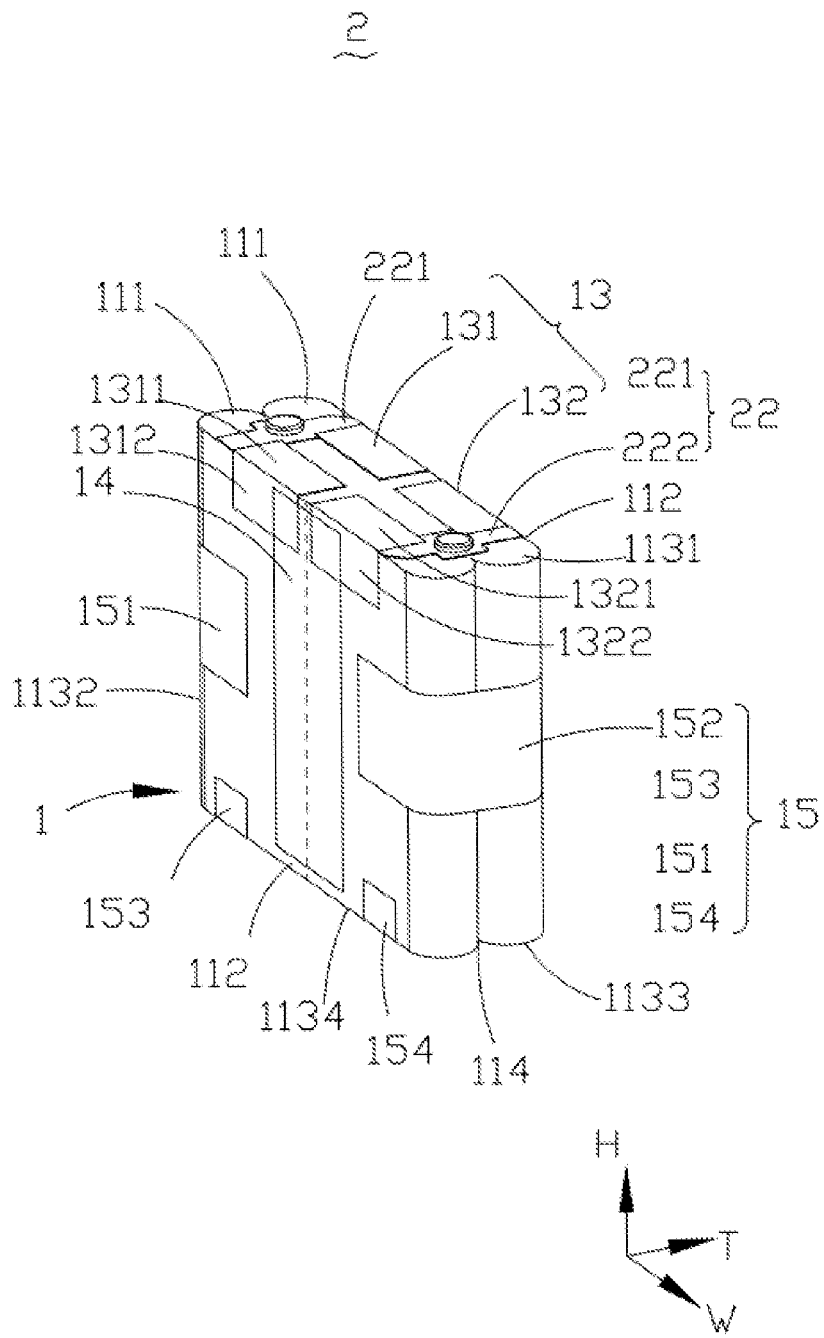
FIG. 1 is a schematic structural view of an energy storage device in an implementation of the disclosure.

REFERENCE SIGNS jelly roll assembly 1; jelly roll 111; first side surface 112; second side surface 114; first end surface 1131; third side surface 1132; fourth side surface 1133; second end surface 1134; tab 12; connection surface 120; attachment surface 124; first connection surface 1212; second connection surface 1222; first attachment surface 1211; second attachment surface 1221; first insulation patch 13; first insulation sub-patch 131; first connection sub-portion 1311; second connection sub-portion 1312; second insulation sub-patch 132; third connection sub-portion 1321; fourth connection sub-portion 1322; second insulation patch 16; third insulation sub-patch 161; fourth insulation sub-patch 162; third insulation patch 171; fourth insulation patch 172; electrode sheet 1111; first electrode sheet 1112; second electrode sheet 1113; first tab 121; second tab 122; tail portion 1110; tail insulation patch 14; bundling insulation patch 15; first bundling insulation patch 151; second bundling insulation patch 152; third bundling insulation patch 153; fourth bundling insulation patch 154; casing 21; opening 211; connector 22; first connector 221; first connection region 2210; second connection region 2211; second connector 222; third connection region 2220; fourth connection region 2221; cover plate 23; energy storage device 2.

DETAILED DESCRIPTION

The technical solutions in implementations of the disclosure are clearly and completely described hereinafter with reference to the accompanying drawings in the implementations of the disclosure. Apparently, the described implementations are merely part of rather than all of the implementations of the disclosure. All other implementations obtained by those of ordinary skill in the art based on the implementations provided herein without creative efforts shall fall within the scope of the disclosure.

Unless otherwise defined, all technical and scientific terms used herein have the same meaning as commonly understood by those of ordinary skill in the art of the disclosure. The terms used herein are for the purpose of describing implementations only and are not intended to limit the disclosure.

The terms "first", "second", and the like used in the specification, claims, and accompany drawings of the disclosure are used for distinguishing different objects rather than for describing a particular sequence. The terms "one", "a", "the", and the like used in the disclosure are not intended to limit a quantity, but are merely intended to indicate that at least one exists. The terms "include", "comprise", "contain", and the like are intended to mean that elements or objects preceding the term encompass elements, objects, or the equivalents listed after the term, without excluding other elements or objects. The terms "connect", "couple", or the like are not limited to physical or mechanical connections but may include electrical connections, whether direct or indirect. The term "cover" refers to a direct contact between two components without a third-party component, or an indirect contact between two components via a third-party components between the two components.

The terms "an implementation", "a specific implementation", "an example", and the like described herein mean that a particular feature, structure, material, or characteristic described in conjunction with the implementations or examples may be contained in at least one implementation or example of the disclosure. The exemplary expressions of the above terms in the specification do not necessarily refer to the same implementation or example. Furthermore, the particular feature, structure, material, or characteristic described may be combined in any suitable manner in one or more implementations or examples.

Figure 2:
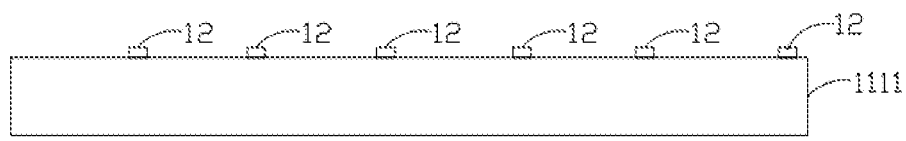
FIG. 2 is a schematic structural view of an unwound electrode sheet in an implementation of the disclosure.
Figure 3:
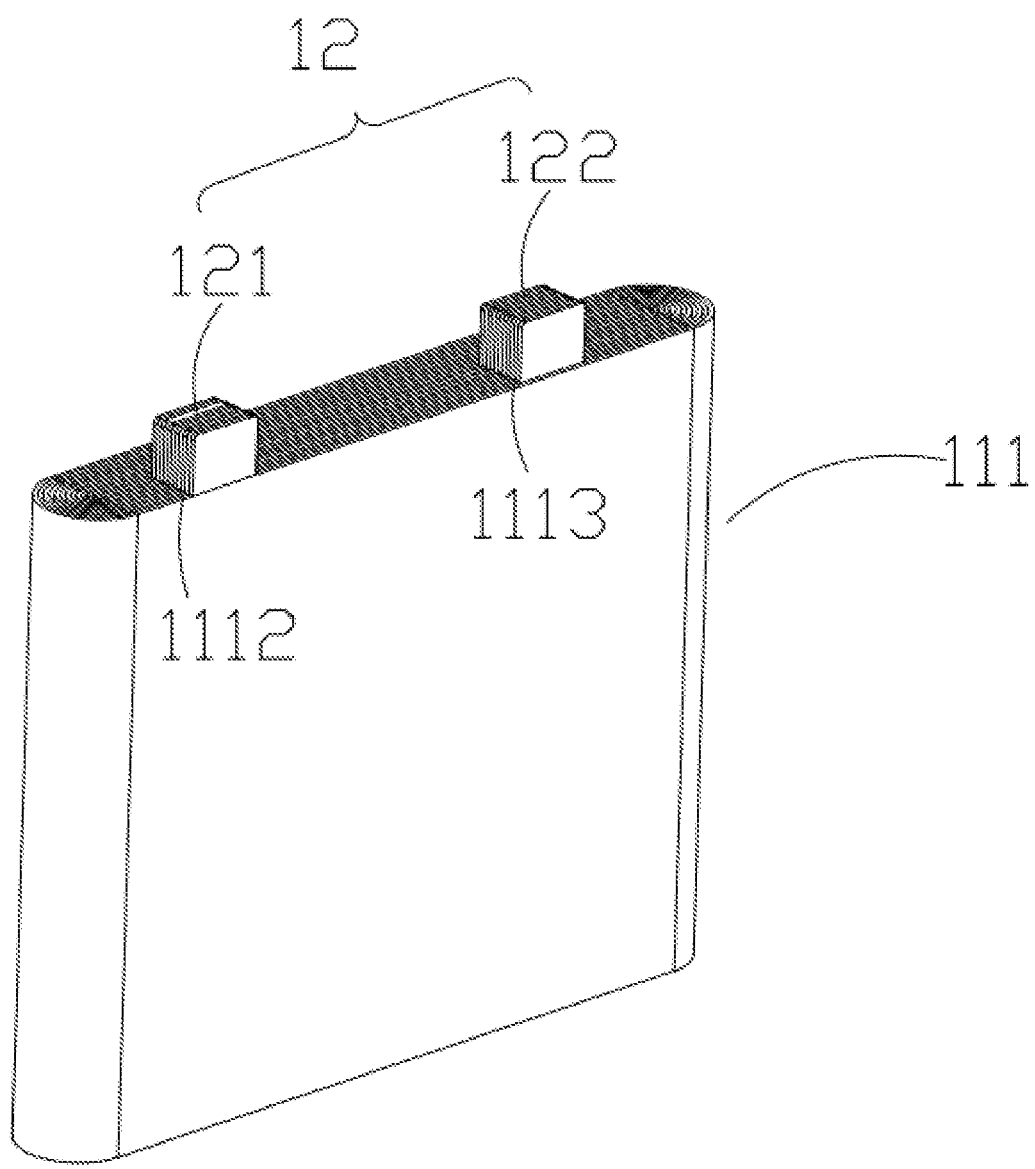
FIG. 3 is a schematic perspective structural view illustrating a first electrode sheet and a second electrode sheet that are stacked and wound in an implementation of the disclosure.
Figure 4:
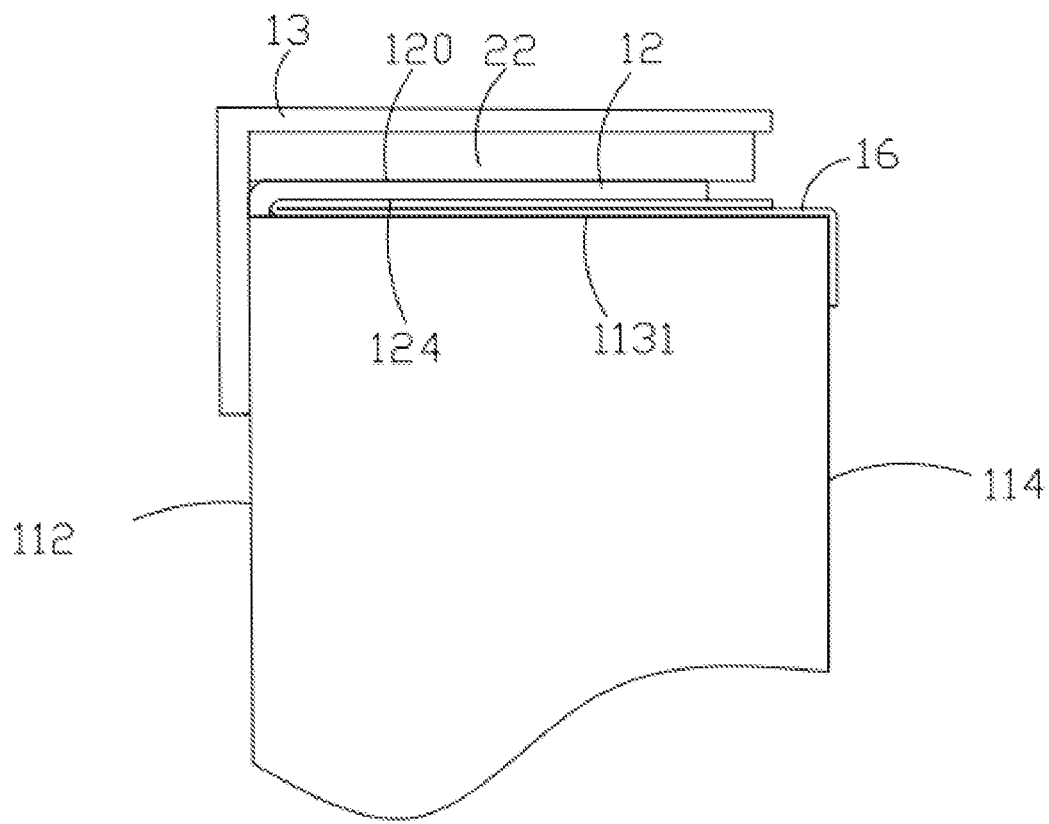
FIG. 4 is a schematic structural view illustrating positions of a tab, a first insulation patch, a second insulation patch, and a connector of a jelly roll in an implementation of the disclosure.
Figure 5:
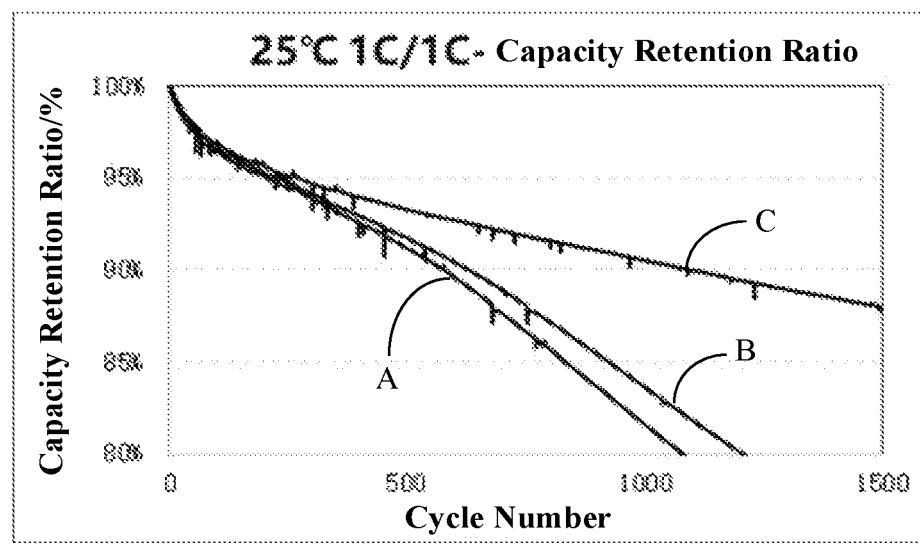
FIG. 5 is a graph illustrating a relationship between capacity fade and cycle numbers of an energy storage device under full charge/full discharge cycle at 1 current (C) and 25° C. in an implementation of the disclosure.

Referring to FIG. 1, FIG. 1 is a schematic structural view of an energy storage device in an implementation of the disclosure. The energy storage device 2 includes a jelly roll assembly 1 and a connector 22. The jelly roll assembly 1 includes at least one jelly roll 111. In the implementations, the jelly roll assembly 1 includes two jelly rolls 111. In other examples, the jelly roll assembly 1 includes one or more jelly rolls 111. Referring to FIGS. 2 and 3, each jelly roll 111 is formed by winding an electrode sheet 1111. The electrode sheet 1111 includes multiple tabs 12, and the multiple tabs 12 are arranged in a thickness direction of the tabs 12 after winding the electrode sheet 1111. Referring to FIG. 1 again, after the winding, the jelly roll 111 has a first side surface 112 and a first end surface 1131 connected with the first side surface 112. Referring to FIGS. 3 and 4, the multiple tabs 12 are bent at roots of the multiple tabs 12 and close to the first end surface 1131. The multiple tabs 12 have a connection surface 120 away from the first end surface 1131. The connector 22 is disposed on the connection surface 120 and connected with the multiple tabs 12. The jelly roll assembly 1 further includes a first insulation patch 13. The first insulation patch 13 adheres to and covers a surface of the connector 22 away from the connection surface 120 and is bent and extends to the first side surface 112. As illustrated by curve B in FIG. 5, under full charge/full discharge cycle at 1 current (C) and 25° C., when a discharge capacity of the energy storage device 2 in which the first insulation patch 13 is attached is attenuated to 90% of a rated capacity of the energy storage device 2, a cycle number of the energy storage device 2 is equal to or larger than 500, and when the discharge capacity of the energy storage device 2 in which the first insulation patch 13 is attached is attenuated to 80% of the rated capacity, the cycle number of the energy storage device 2 is equal to or larger than 1200.

When soldering residues fall into the jelly roll 111, the soldering residues that fall off may cause short circuit. In addition, the soldering residues that fall off may be corroded by an electrolyte to form metal ions, where the metal ions may be precipitated on a surface of a negative electrode sheet of the electrode sheet 1111 along charging/discharging cycles, and gradually penetrate a separator between a positive electrode sheet and the negative electrode sheet of the electrode sheet 1111 to cause short circuit. In the disclosure, since the first insulation patch 13 adheres to and covers the connector 22 and extends to the first side surface 112, the first insulation patch 13 may cover the connector 22 and the tab 12 to the maximum extent. Even if there are soldering residues falling from the connector 22 and the tab 12, the first insulation patch 13 may stick the soldering residues and prevent the soldering residues from entering the jelly roll 111, thus improving the security of the energy storage device 2. Furthermore, as illustrated by curve B in FIG. 5, when the discharge capacity of the energy storage device 2 in which the first insulation patch 13 is attached is attenuated to 90% of the rated capacity of the energy storage device 2, the cycle number of the energy storage device 2 is equal to or larger than 500, and when the discharge capacity of the energy storage device 2 in which the first insulation patch 13 is attached is attenuated to 80% of the rated capacity, the cycle number of the energy storage device 2 is equal to or larger than 1200. In contrast, as illustrated by curve A in FIG. 5, when a discharge capacity of the energy storage device 2 in which no first insulation patch 13 is attached is attenuated to 90% of the rated capacity of the energy storage device 2, a cycle number of the energy storage device 2 is equal to or larger than 500, but when the discharge capacity of the energy storage device 2 in which no first insulation patch 13 is attached is attenuated to 80% of the rated capacity, the cycle number of the energy storage device 2 is equal to or less than 1200. Therefore, it is proved by experiments that, with the first insulation patch 12, the service life of the energy storage device 2 can be prolonged.

It can be understood that the tab 12 is a metal sheet that is flexible and bendable, and the tab 12 has two large surfaces opposite each other and two small side surfaces connected with the two large surfaces, where an area of each of the two small side surfaces is significantly less than an area of each of the two large surfaces. A thickness of the tab 12 refers to a distance between the two opposite large surfaces of the tab 12. Therefore, the thickness direction of the tabs 12 refers to a direction perpendicular to the large surfaces of the tabs 12. For example, the second one of the tabs 12 is stacked on the first one of the tabs 12 in the thickness direction of the tabs 12, the third one of the tabs 12 is stacked on the second one of the tabs 122 in the thickness direction of the tabs 12, and so on. After the winding, in the case where the jelly roll 111 is not connected with the connector 22, the multiple tabs 12 extend out substantially perpendicularly from an end face of the jelly roll 111 that is close to the first end surface 1131. In the case where the multiple tabs 12 are connected with the connector 22, the multiple tabs 12 are bent at the roots of the multiple tabs 12 and close to the first end surface 1131. The roots of the multiple tabs 12 refer to positions where the multiple tabs 12 are connected with the electrode sheet 1111. It can be understood that the multiple tabs 12 are bent at the roots of the multiple tabs 12 and close to the first end surface 1131, which means that a plane where the multiple tabs 12 are located is parallel to a plane where the first end surface 1131 is located or that an included angle between the plane where the multiple tabs 12 are located and the plane where the first end surface 1131 is located is within a predetermined range. For example, the included angle is less than or equal to 5 degrees, etc. An actual gap between the multiple tabs 12 and the first end surface 1131 may be minimal, and in some cases, the multiple tabs 12 may even be directly attached to the first end surface 1131, which is not limited herein.

In some implementations, the first insulation patch 13 is a blue film adhesive. A main body of the blue film adhesive is made of polyethylene terephthalate (PET), and glue of the blue film adhesive is acrylic glue. It is appreciated that in other implementations, the first insulation patch 13 may be an insulating tape of other kinds and having a certain strength.

In some implementations, a thickness of the first insulation patch 13 is 50 μm. Thus, the first insulation patch 13 has sufficient rigidity to prevent metal particles from penetrating the first insulation patch 13. It is appreciated that in other implementations, the thickness of the first insulation patch 13 may be, but is not limited to, 50 μm, for example, 45 μm or 55 μm, etc.

Referring to FIG. 1 again, for ease of illustration, three directions are specifically defined, i.e., a width direction W, a height direction H, and a thickness direction T of the jelly roll 111.

In an implementation, the first insulation patch 13 covers at least an edge of the first side surface 112 connected with the first end surface 1131 in the height direction H.

Figure 6:
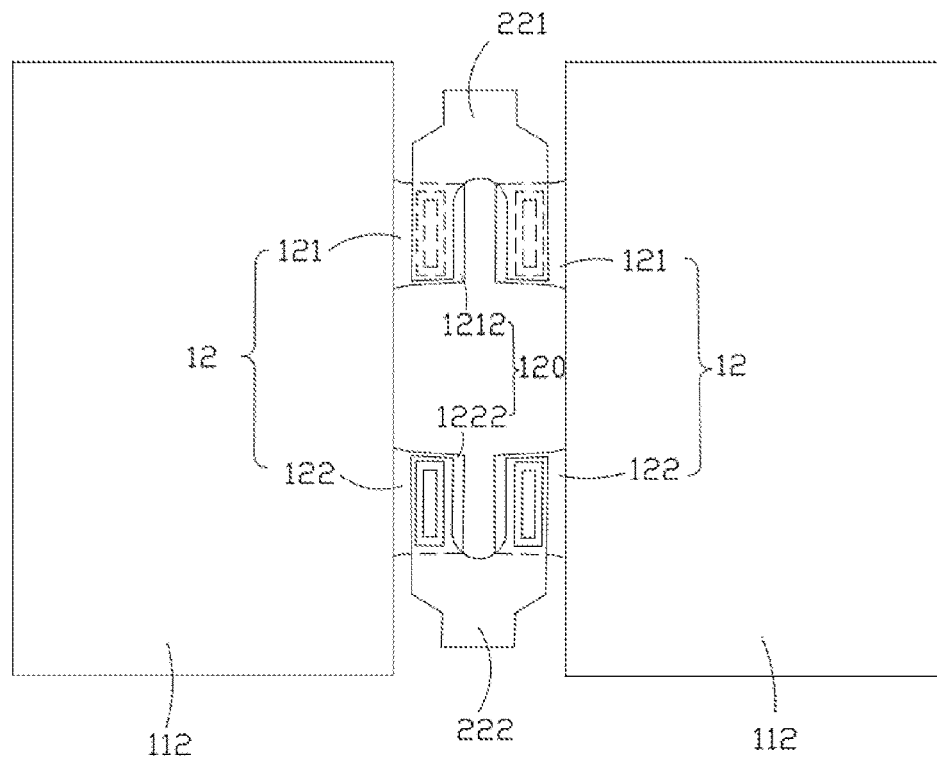
FIG. 6 is a schematic plan view of two jelly rolls in the energy storage device of FIG. 1 in an implementation of the disclosure, where the two jelly rolls are unfolded relative to each other with their respective tabs as reference, and a connector, a first insulation patch, a tail insulation patch, and bundling insulation patches of the energy storage device of FIG. 1 are omitted.

In an implementation, referring to FIG. 3 again, the electrode sheet 1111 includes a first electrode sheet 1112 and a second electrode sheet 1113. Each jelly roll 111 is formed by winding the first electrode sheet 1112 and the second electrode sheet 1113. The first electrode sheet 1112 includes multiple first tabs 121, the second electrode sheet 1113 includes multiple second tabs 122, and the multiple first tabs 121 are arranged in a thickness direction of the first tabs 121 after the winding. The thickness direction of the first tabs 121 refers to a direction perpendicular to a large surface of the first tab 121. The multiple second tabs 122 are arranged in a thickness direction of the second tabs 122 after the winding. The thickness direction of the second tabs 122 refers to a direction perpendicular to a large surface of the second tab 122. A polarity of the multiple first tabs 121 is opposite to a polarity of the multiple second tabs 122. In the implementations, the multiple first tabs 121 may be positive tabs and the multiple second tabs 122 may be negative tabs. It can be understood that in other implementations, the multiple first tabs 121 may be negative tabs and the multiple second tabs 122 may be positive tabs. Referring to FIG. 1 again, the connector 22 includes a first connector 221 and a second connector 222. Referring to FIG. 1 and FIG. 6 together. The multiple first tabs 121 have a first connection surface 1212 away from the first end surface 1131. The first connector 221 covers the first connection surface 1212 and is connected with the multiple first tabs 121. The multiple second tabs 122 have a second connection surface 1222 away from the first end surface 1131. The second connector 222 covers the second connection surface 1222 and is connected with the multiple second tabs 122. Referring to FIG. 1 again, the first insulation patch 13 includes a first insulation sub-patch 131 and a second insulation sub-patch 132. The first insulation sub-patch 131 adheres to and covers a surface of the first connector 221 away from the first end surface 1131 and extends to the first side surface 112, and the second insulation sub-patch 132 adheres to and covers a surface of the second connector 222 away from the first end surface 1131 and extends to the first side surface 112.

Accordingly, the first connector 221 is disposed on each of the multiple first tabs 121, and the first insulation sub-patch 131 is disposed on the first connector 221. The first insulation sub-patch 131 may extend from a position above the first end surface 1131, that is, the first insulation sub-patch 131 may extend from a surface of the first connector 221 away from the first end surface 1131 to the first side surface 112. In this way, a solder zone between the first tab 121 and the first connector 221 may be fully covered by the first insulation sub-patch 131, which prevents soldering residues in the solder zone, which may fall off in day-to-day use, from entering the jelly roll 111, thereby avoiding short circuit caused by the soldering residues. In addition, the soldering residues that fall off are prevented from being corroded to form metal ions by the electrolyte, where the metal ions may be precipitated on the surface of the negative electrode sheet of the electrode sheet 1111 along charging/discharging cycles and gradually penetrate the separator between the positive electrode sheet and the negative electrode sheet of the electrode sheet 1111 to cause short circuit. Similarly, the second connector 222 is disposed on each of the multiple second tabs 122, and the second insulation sub-patch 132 is disposed on the second connector 222. The second insulation sub-patch 132 may extend from a position above the first end surface 1131, that is, the second insulation sub-patch 132 may extend from a surface of the second connector 222 away from the first end surface 1131 to the first side surface 112. In this way, a solder zone between the second tab 122 and the second connector 222 may be fully covered by the second insulation sub-patch 132. Thus, it is possible to avoid a problem that the service life of the energy storage device 2 is shortened due to short circuit that is caused by soldering residues that fall off, and the service life of the energy storage device 2 can be prolonged.

Referring to FIG. 1 again, in some implementations, the first insulation sub-patch 131 includes a first connection sub-portion 1311 and a second connection sub-portion 1312 connected with the first connection sub-portion 1311. The first connection sub-portion 1311 adheres to an upper side of the first end surface 1131, and the second connection sub-portion 1312 is bent downwards relative to the first connection sub-portion 1311 and adheres to the first side surface 112. In the width direction W of the jelly roll 111, the first connection sub-portion 1311 exceeds an edge of the first connector 221 by a distance greater than or equal to 2 mm. In the thickness direction T of the jelly roll 111, the first connection sub-portion 1311 exceeds an edge of the first connector 221 by a distance greater than or equal to 2 mm. In the height direction H of the jelly roll 111, a length of the second connection sub-portion 1312 is greater than or equal to 2 mm. The second insulation sub-patch 132 includes a third connection sub-portion 1321 and a fourth connection sub-portion 1322 connected with the third connection sub-portion 1321. The third connection sub-portion 1321 adheres to the upper side of the first end surface 1131. The fourth connection sub-portion 1322 is bent downwards relative to the third connection sub-portion 1321 and adheres to the first side surface 112. In the width direction W of the jelly roll 111, the third connection sub-portion 1321 exceeds an edge of the second connector 222 by a distance greater than or equal to 2 mm. In the thickness direction T of the jelly roll 111, the third connection sub-portion 1321 exceeds an edge of the second connector 222 by a distance greater than or equal to 2 mm. In the height direction H of the jelly roll 111, a length of the fourth connection sub-portion 1322 is greater than or equal to 2 mm.

In this way, the first insulation sub-patch 131 has a reliable and stable connection with the jelly roll 111 and the first connector 221. Even if the jelly roll assembly 1 is soaked in the electrolyte for a long time, and even if any soldering residue falls off and sticks to a surface of the first insulation sub-patch 131, a connection reliability between the first insulation sub-patch 131 and the jelly roll 111 and the first connector 221 may not be affected. The second insulation sub-patch 132 has a reliable and stable connection with the jelly roll 111 and the second connector 222. Even if the jelly roll assembly 1 is soaked in the electrolyte for a long time, and even if any soldering residue falls off and sticks to a surface of the second insulation sub-patch 132, a connection reliability between the second insulation sub-patch 132 and the jelly roll 111 and the second connector 222 may not be affected.

In an implementation, the first insulation sub-patch 131 has an elongation at break of 120%-140% at a bending connection region between the first connection sub-portion 1311 and the second connection sub-portion 1312 when subject to an expansion force of the at least one jelly roll 111, and the second insulation sub-patch 132 has an elongation at break of 120%-140% at a bending connection region between the third connection sub-portion 1321 and the fourth connection sub-portion 1322 when subject to the expansion force of the at least one jelly roll 111. The elongation at break refers to a ratio of a displacement value at the point of breaking to an original length of a specimen, expressed as a percentage (%).

Thus, in the case where the energy storage device 2 adheres to the first insulation sub-patch 131 and the second insulation sub-patch 132, the first insulation sub-patch 131 and the second insulation sub-patch 132 may also counteract the expansion force of the jelly roll 111 during charging and discharging. In other words, the first insulation sub-patch 131 and the second insulation sub-patch 132 may also serve to restrain an expansion of the jelly roll 111 during charging and discharging. As such, a flatness of the jelly roll 111 can be maintained during charging and discharging, the electrolyte can have a better entry effect, and lithium plating can be reduced. Thus, a cycle number of charging and discharging of the energy storage device 2 can be increased, that is, the service life of the energy storage device 2 can be prolonged.

In an implementation, the first insulation sub-patch 131 has a deformation ratio of 0-20% at the bending connection region between the first connection sub-portion 1311 and the second connection sub-portion 1312 when subject to the expansion force of the at least one jelly roll 111, and the second insulation sub-patch 132 has a deformation ratio of 0-20% at the bending connection region between the third connection sub-portion 1321 and the fourth connection sub-portion 1322 when subject to the expansion force of the at least one jelly roll 111. As such, the deformation rate of the first insulation sub-patch 131 and the deformation rate of the second insulation sub-patch 132 can be controlled within a range of 0-20% to prevent fractures of the first insulation sub-patch 131 and the second insulation sub-patch 132 caused by the expansion force of the jelly roll 111. The first insulation sub-patch 131 and the second insulation sub-patch 132 may also be prevented from being excessively stretched, where excessive stretching of the first insulation sub-patch 131 and the second insulation sub-patch 132 may cause local thinning and reduced insulation performance of the first insulation sub-patch 131 and the second insulation sub-patch 132, which may adversely affect the cycling performance of the energy storage device 2.

In an implementation, referring to FIG. 1 and FIG. 6 again, in the case where the jelly roll assembly 1 includes two jelly rolls 111, the jelly roll assembly 1 includes two first tabs 121 and two second tabs 122. The two first tabs 121 face each other, and the two second tabs 122 face each other. Each first tab 121 has a corresponding first insulation sub-patch 131, and each second tab 122 has a corresponding second insulation sub-patch 132. Therefore, soldering residues generated by each of the first tabs 121 and each of the second tabs 122 can be effectively controlled.

In an implementation, a projection of the first connector 221 on the first end surface 1131 at least partially overlaps a projection of the first tab 121 on the first end surface 1131. The first connector 221 is disposed on a surface of the first tab 121 away from the first end surface 1131. The first insulation sub-patch 131 covers the first connector 221 and part of the first tab 121 that is not covered by the first connector 221. It can be understood that, the first insulation sub-patch 131 fully covers at least a soldering connection zone between the first connector 221 and the first tab 121. A projection of the second connector 222 on the first end surface 1131 at least partially overlaps a projection of the second tab 122 on the first end surface 1131. The second connector 222 is disposed on a surface of the second tab 122 away from the first end surface 1131. The second insulation sub-patch 132 covers the second connector 222 and part of the second tab 122 that is not covered by the second connector 222. It can be understood that, the second insulation sub-patch 132 fully covers at least a soldering connection zone between the second connector 222 and the second tab 122.

Thus, the first insulation sub-patch 131 can effectively prevent soldering residues on the soldering connection zone between the first tab 121 and the first connector 221 from falling off, and the second insulation sub-patch 132 can effectively prevent soldering residues on the soldering connection zone of the second tab 122 and the second connector 222 from falling off.

Figure 7:
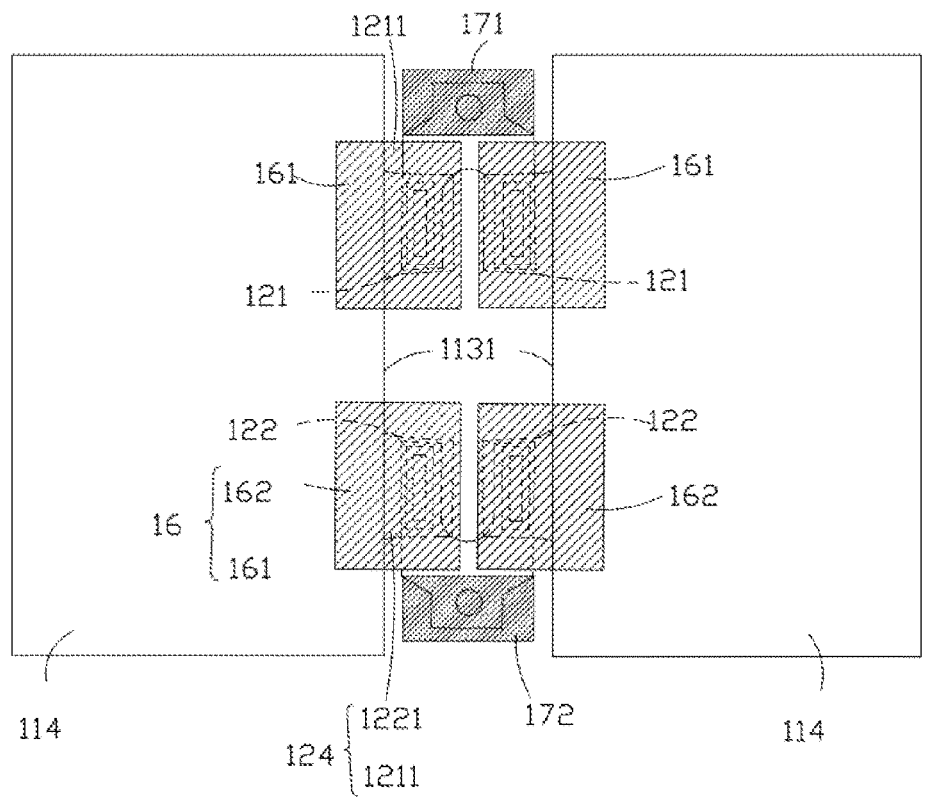
FIG. 7 is a schematic plan view of the two jelly rolls in FIG. 6 in an implementation of the disclosure, a viewing direction in FIG. 7 and a viewing direction in FIG. 6 form 180 degrees.

Referring to FIG. 1 and FIG. 7 together, the jelly roll 111 further has a second side surface 114 opposite the first side surface 112. In the case where the two jelly rolls 111 are disposed back-to-back, the second side surface 114 of the two jelly rolls 111 abut against each other. The tab 12 has an attachment surface 124 close to the first end surface 1131. The jelly roll assembly 1 further includes a second insulation patch 16. The second insulation patch 16 adheres to and covers the attachment surface 124 and extends to the first end surface 1131 and the second side surface 114.

The second insulation patch 16 adheres to and covers the attachment surface 124 and extends to the first end surface 1131 and the second side surface 114 of the jelly roll 111, which can ensure that the attachment surface 124 of the tab 12 may be fully covered, preventing any soldering residue or impurities on the attachment surface 124 of the tab 12 from falling off. Furthermore, the second insulation patch 16 also extends to the first end surface 1131 and the second side surface 114 of the jelly roll 111, so that connection reliability among the second insulation patch 16, the tab 12, the first end surface 1131, and the second side surface 114 can be significantly increased, and no part may fall off even if the jelly roll 111 is soaked in the electrolyte for a long time.

In the implementations, the second insulation patch 16 is a blue film adhesive. A main body of the blue film adhesive is made of PET, and glue of the blue film adhesive is acrylic glue. It is appreciated that in other implementations, the second insulation patch 16 may be an insulating tape of other kinds and having a certain strength.

In an implementation, the thickness of the second insulation patch 16 is 50 μm. Thus, the second insulation patch 16 may have a sufficient thickness to prevent metal particles from penetrating the second insulation patch 16. It is appreciated that in other implementations, the thickness of the second insulation patch 16 may be, but is not limited to, 50 μm, for example, 45 μm or 55 μm, etc.

Specifically, the multiple first tabs 121 have a first attachment surface 1211 close to the first end surface 1131. The multiple second tabs 122 have a second attachment surface

1221 close to the first end surface 1131. The second insulation patch 16 includes a third insulation sub-patch 161 and a fourth insulation sub-patch 162. The third insulation sub-patch 161 adheres to and covers the first attachment surface 1211 and extends to the first end surface 1131 and the second side surface 114 of the jelly roll 111. The fourth insulation sub-patch 162 adheres to and covers the second attachment surface 1221 and extends to the first attachment surface 1131 and the second side surface 114.

Thus, the first attachment surface 1211 of the first tabs 121 is covered by the third insulation sub-patch 161, so that the first attachment surface 1211 of the first tab 121 can be effectively protected, preventing soldering residues on the first tab 121 from falling off to a maximum extent. The third insulation sub-patch 161 may further extend to the first end surface 1131 and the second side surface 114, so that connection reliability among the third insulation sub-patch 161, the first tab 121, the first end surface 1131, and the second side surface 114 of the jelly roll 111 can be significantly increased, and no part may fall off even if the jelly roll 111 is soaked in the electrolyte for a long time, thereby increasing the connection reliability. The second attachment surface 1221 of the second tabs 122 is covered by the fourth insulation sub-patch 162, so that the second attachment surface 1221 of the second tab 122 can be effectively protected, preventing soldering residues on the second tab 122 from falling off to a maximum extent. The fourth insulation sub-patch 162 also extends to the first end surface 1131 and the second side surface 114, so that the connection reliability among the fourth insulation sub-patch 162, the second tab 122, the first end surface 1131, and the second side surface 114 can be significantly increased, and no part may fall off even if the jelly roll 111 is soaked in the electrolyte for a long time, thereby increasing the connection reliability.

In an implementation, in the width direction W of the at least one jelly roll 111, the third insulation sub-patch 161 exceeds an edge of the first attachment surface 1211 by a distance greater than or equal to 2 mm. In the thickness direction T of the at least one jelly roll 111, the third insulation sub-patch 161 exceeds an edge of the first attachment surface 1211 by a distance greater than or equal to 2 mm. In the width direction W of the at least one jelly roll 111, the fourth insulation sub-patch 162 exceeds an edge of the second attachment surface 1221 by a distance greater than or equal to 2 mm. In the thickness direction T of the at least one jelly roll 111, the fourth insulation sub-patch 162 exceeds an edge of the second attachment surface 1221 by a distance greater than or equal to 2 mm.

In an implementation, in the height direction H of the at least one jelly roll 111, the third insulation sub-patch 161 extends on the second side surface 114 by a distance greater than or equal to 2 mm. In the height direction H of the at least one jelly roll 111, the fourth insulation sub-patch 162 extends on the second side surface 114 by a distance greater than or equal to 2 mm.

Thus, the third insulation sub-patch 161 has a reliable and stable connection with the jelly roll 111. Even if the jelly roll assembly 1 is soaked in the electrolyte for a long time, and even if any soldering residue falls off and sticks to a surface of the third insulation sub-patch 161, a connection reliability between the third insulation sub-patch 161 and the jelly roll 111 may not be affected. The fourth insulation sub-patch 162 has a reliable and stable connection with the jelly roll 111. Even if the jelly roll assembly 1 is soaked in the electrolyte for a long time, and even if any soldering residue falls off and sticks to a surface of the fourth insulation sub-patch 162, a connection reliability between the fourth insulation sub-patch 162 and the jelly roll 111 may not be affected.

In an implementation, the third insulation sub-patch 161 has an elongation at break of 120-140% at a bending connection region between the first end surface 1131 and the second side surface 114 when subject to the expansion force of the jelly roll 111. The fourth insulation sub-patch 162 has an elongation at break of 120-140% at a bending connection region between the first end surface 1131 and the second side 114 when subject to the expansion force of the jelly roll 111.

Thus, in the case where the energy storage device 2 adheres to the third insulation sub-patch 161 and the fourth insulation sub-patch 162, the third insulation sub-patch 161 and the fourth insulation sub-patch 162 may also counteract the expansion force of the jelly roll 111 during charging and discharging. In other words, the third insulation sub-patch 161 and the fourth insulation sub-patch 162 may also serve to restrain the expansion of the jelly roll 111 during charging and discharging. As such, the flatness of the jelly roll 111 can be maintained during charging and discharging, the electrolyte can have a better entry effect, and lithium plating can be reduced, Thus, the cycle number of charging and discharging of the energy storage device 2 can be increased, that is, the service life of the energy storage device 2 can be prolonged.

Further, in the case where the energy storage device 2 adheres to the first insulation sub-patch 131 and the second insulation sub-patch 132, the first insulation sub-patch 131 and the second insulation sub-patch 132 may counteract an expansion force of the jelly roll 111 that is applied on the first side surface 112 during charging and discharging. In the case where the energy storage device 2 adheres to the third insulation sub-patch 161 and the fourth insulation sub-patch 162, the third insulation sub-patch 161 and the fourth insulation sub-patch 162 may also counteract an expansion force of the jelly roll 111 that is applied on the second side surface 114 during charging and discharging. As such, a balance in bundling protection forces applied on the jelly roll 111 in the thickness direction T of the jelly roll 111 can be realized during charging and discharging, further improving the entry effect of the electrolyte and reducing lithium plating. As a result, the cycle number of charging and discharging of the energy storage device 2 can be further increased, that is, the service life of the energy storage device 2 can be further prolonged.

Figure 8:
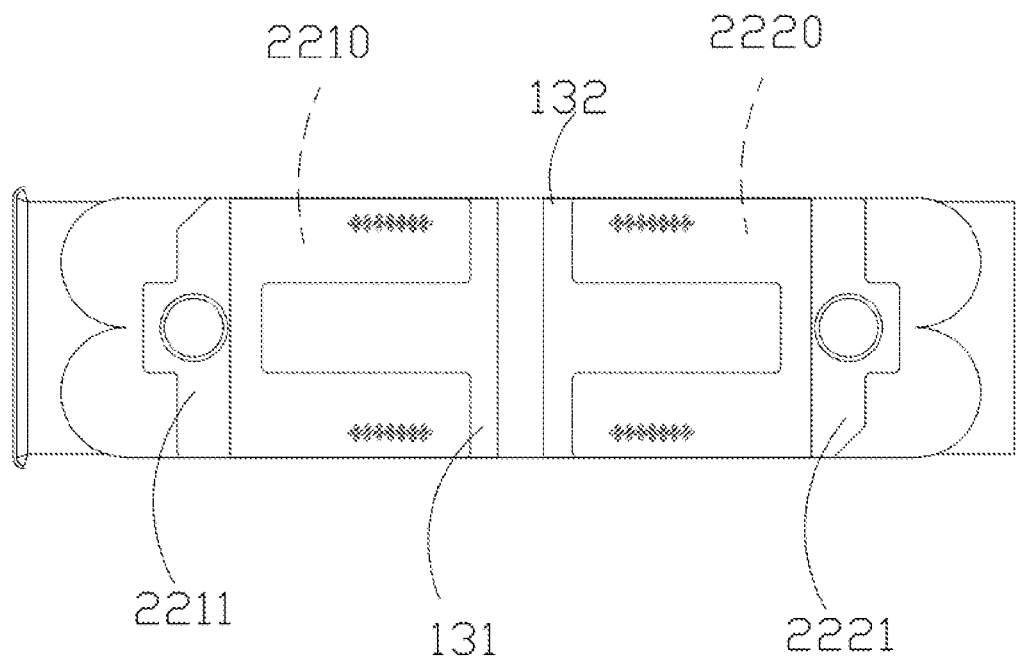
FIG. 8 is a top view of the energy storage device in FIG. 1 in an implementation of the disclosure, where a cover plate of the energy storage device is illustrated.

In an implementation, referring to FIG. 8, the first connector 221 includes a first connection region 2210 and a second connection region 2211. In the implementations, there are two first connection regions 2210 and one second connection region 2211. A U-shaped structure is formed between one second connection region 2211 and two first connection regions 2210. Each first connection region 2210 is connected with one first tab 121. The first insulation sub-patch 131 covers one side of the first connection region 2210 away from the first end surface 1131 and the second connection region 2211 is exposed. The second connector 222 includes a third connection region 2220 and a fourth connection region 2221. In the implementations, there are two third connection regions 2220 and one fourth connection region 2221. A U-shaped structure is formed between one fourth connection region 2221 and two third connection regions 2220. Each third connection region 2220 is connected with one second tab 122. The second insulation sub-patch 132 covers one side of the third connection region 2220 away from the first end surface 1131 and the fourth connection region 2221 is exposed.

Thus, the second connection region 2211 is configured to be connected with a first pole, and the fourth connection region 2221 is configured to be connected with a second pole. Since the first insulation sub-patch 131 covers the one side of the first connection region 2210 away from the first end surface 1131 and the second connection region 2211 is exposed, it is convenient for the second connection region 2211 to be soldered to the first pole. Since the second insulation sub-patch 132 covers the one side of the third connection region 2220 away from the first end surface 1131 and the fourth connection region 2221 is exposed, it is convenient for the fourth connection region 2221 to be soldered with the second pole.

In an implementation, referring to FIG. 7 again, the jelly roll assembly 1 further includes a third insulation patch 171 and a fourth insulation patch 172. The third insulation patch 171 covers one side of the second connection region 2211 facing the first end surface 1131. The fourth insulation patch 172 covers one side of the fourth connection region 2221 facing the first end surface 1131.

Thus, the third insulation patch 171 can prevent soldering residues generated during a soldering of the first pole from falling off, and the fourth insulation patch 172 can prevent soldering residues generated during a soldering of the second pole from falling off. Thus, soldering residues generated during soldering of the first pole and the second pole can be prevented from falling into the jelly roll 111, where soldering residues may cause problems such as short circuit, thereby affecting the service life of the energy storage device 2.

It can be understood that, in another implementation, it is only required that the third insulation patch 171 fully covers one side of the first connector 221 facing the first end surface 1131, and the fourth insulation patch 172 fully covers one side of the second connector 222 facing the first end surface 1131.

Thus, the third insulation patch 171 can sufficiently protect the second connection region 2211, an adhesive strength between the third insulation patch 171 and the second connection region 2211 can be enhanced. Even if the third insulation patch 171 is soaked in the electrolyte for a long time, the third insulation patch 171 may not be separated from the second connection region 2211, thereby improving the connection stability. The fourth insulation patch 172 can sufficiently protect the fourth connection region 2221, an adhesive strength between the fourth insulation patch 172 and the fourth connection region 2221 can be enhanced, thereby improving the adhesive stability. Even if the fourth insulation patch 172 is soaked in the electrolyte for a long time, the fourth insulation patch 172 may not be separated from the fourth connection region 2221.

In an implementation, in the thickness direction T, the third insulation patch 171 exceeds an edge of the second connection region 2211 by a distance greater than or equal to 2 mm, and in the width direction W, the third insulation patch 171 exceeds an edge of the second connection region 2211 by a distance greater than or equal to 2 mm. In the thickness direction T, the fourth insulation patch 172 exceeds an edge of the fourth connection region 2221 by a distance greater than or equal to 2 mm, and in the width direction W, the fourth insulation patch 172 exceeds an edge of the fourth connection region 2221 by a distance greater than or equal to 2 mm.

Thus, the adhesive strength of the third insulation patch 171 is further enhanced, and even if the third insulation patch 171 is soaked in the electrolyte for a long time, the third insulation patch 171 may not be separated from the second connection region 2211, thereby improving the connection stability. The adhesive strength of the fourth insulation patch 172 is further enhanced, the adhesive stability is improved, and even if the fourth insulation patch 172 is soaked in the electrolyte for a long time, the fourth insulation patch 172 may not be separated from the fourth connection region 2221.

In an implementation, the third insulation patch 171 extends from the second connection region 2211 to cover the first connection region 2210 and partially overlaps the third insulation sub-patch 161. The fourth insulation patch 172 extends from the fourth connection region 2221 to cover the third connection region 2220 and partially overlaps the fourth insulation sub-patch 162.

Thus, the third insulation patch 171 can sufficiently protect the second connection region 2211, and the third insulation patch 171 partially overlaps and adheres to the third insulation sub-patch 161. The connection reliability of the third insulation patch 171 and the connection reliability of the third insulation sub-patch 161 can be enhanced. Even if the jelly roll 111 is soaked in the electrolyte for a long time, the third insulation patch 171 may not be separated from the second connection region 2211, and the third insulation sub-patch 161 may not be separated from the first connection region 2210, and the third insulation patch 171 and the third insulation sub-patch 161 may be not separated from each other, thereby improving the connection stability. The fourth insulation patch 172 may sufficiently protect the fourth connection region 2221, and the third connection region 2220 may partially overlap and adhere to the fourth insulation sub-patch 162. The connection reliability of the fourth insulation patch 172 and the connection reliability of the fourth insulation sub-patch 162 can be enhanced. Even if the jelly roll 111 is soaked in the electrolyte for a long time, the fourth insulation patch 172 may not be separated from the fourth connection region 2221, the fourth insulation sub-patch 162 may not be separated from the third connection region 2220, and the fourth insulation patch 172 may be not separated from the fourth insulation sub-patch 162.

Figure 9:
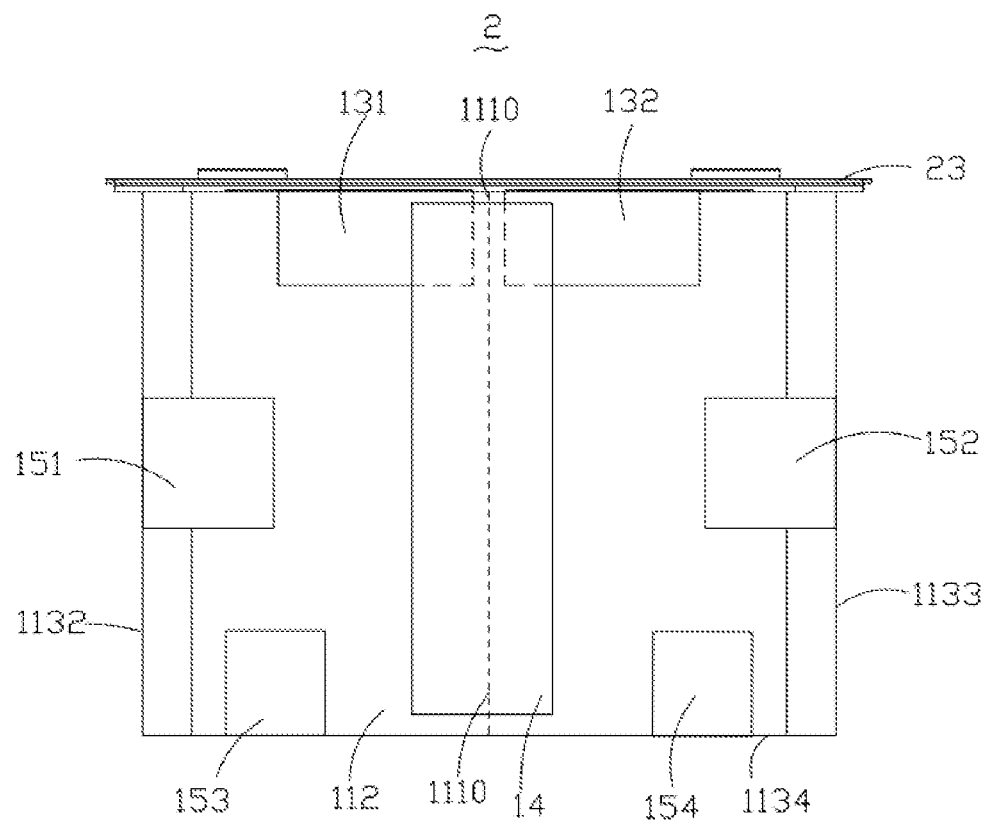
FIG. 9 is a front view of the energy storage device in FIG. 1 in an implementation of the disclosure, where a cover plate of the energy storage device is illustrated.

Referring to FIG. 1 and FIG. 9, the jelly roll 111 is provided with a tail portion 1110 on the first side surface 112, the jelly roll assembly 1 further includes a tail insulation patch 14, and the tail insulation patch 14 adheres to and covers the first side surface 112 and the tail portion 1110.

In an implementation, the electrode sheet 1111 includes the first electrode sheet 1112 and the second electrode sheet 1113. The jelly roll 111 is formed by winding the first electrode sheet 1112 and the second electrode sheet 1113. The jelly roll 111 has the tail portion 1110 wound. In the case where the jelly roll assembly 1 includes two jelly rolls 111 arranged back to back, the two jelly rolls 111 serve as the two opposite outer jelly rolls. In the case where the jelly roll assembly 1 includes multiple jelly rolls 111 arranged back-to-back, for example that the jelly roll assembly 1 includes four jelly rolls 111, the tail portions of two inner jelly rolls 111 are pressed by the two adjacent jelly rolls 111, and the two outermost jelly rolls 111 of the four jelly rolls 111 are two opposite outer jelly rolls. The tail insulation patch 14 adheres to the first side surface 112 and covers the tail portion 1110 of the outer jelly roll, and can counteract a tension force applied on the tail portion 1110 caused by the expansion of the jelly roll 111 during charging and discharging.

In the implementations, the tail insulation patch 14 is a blue film adhesive. A main body of the blue film adhesive is made of PET, and glue of the blue film adhesive is acrylic glue. It is appreciated that in other implementations, the tail insulation patch 14 may be an insulating tape of other kinds and having a certain strength.

In an implementation, the thickness of the tail insulation patch 14 is 30 μm. It can be understood that in other implementations, the thickness of the tail insulation patch 14 may be, but is not limited to, 30 μm.

In an implementations, the tail insulation patch 14 has a width ranging from 24 mm to 26 mm.

In an implementation, in the height direction H, a difference between a size of the tail insulation patch 14 of the jelly roll 111 and a size of the jelly roll 111 is less than a preset threshold.

Thus, the tail insulation patch 14 can substantially cover the first side surface 112 of the jelly roll 111 in the height direction H of the jelly roll 111, so as to cover the tail portion 1110 of the jelly roll 111, thereby counteracting a tension force applied on the tail portion 1110 caused by the expansion of the jelly roll 111 during charging and discharging and maintaining the structural stability.

In an implementation, on the same first side surface 112, the tail insulation patch 14 is positioned between the first insulation sub-patch 131 and the second insulation sub-patch 132.

Thus, the tail insulation patch 14, the first insulation sub-patch 131, and the second insulation sub-patch 132 respectively cover different regions of the first side surface, and thus provide corresponding adhesive forces for different regions to counteract the expansion force of the at least one jelly roll 111 during charging and discharging.

In an implementation, the tail insulation patch 14 at least partially covers and adheres to at least one of the first insulation sub-patch 131 or the second insulation sub-patch 132. In the implementations, at least one of the first insulation sub-patch 131 or the second insulation sub-patch 132 partially overlaps the tail insulation patch 14.

Thus, at least one of the first insulation sub-patch 131 or the second insulation sub-patch 132 partially overlaps the tail insulation patch 14 to further enhance adhesion, thereby increasing the adhesion stability between the first insulation sub-patch 131 and the tail insulation patch 14 and the adhesion stability between the second insulation sub-patch 132 and the tail insulation patch 14. Even if the at least one jelly roll 111 is soaked in the electrolyte for a long time in practical use, the first insulation sub-patch 131 and the second insulation sub-patch 132 may not be separated from the at least one jelly roll 111 or upwarp, thereby significantly improving the use stability of the energy storage device 2.

In an implementation, referring to FIG. 1 and FIGS. 9 to 11, the jelly roll 111 further includes a third side surface 1132, a fourth side surface 1133, and a second end surface 1134. The second end surface 1134 is opposite to the first end surface 1131. The third side surface 1132 is opposite to the fourth side surface 1133. The first end surface 1131 is connected with one side of the first side surface 112, one side of the second side surface 114, one side of the third side surface 1132, and one side of the fourth side surface 1133. The second end face 1134 is connected with the other side of the first side surface 112, the other side of the second side surface 114, the other side of the third side surface 1132, and the other side of the fourth side surface 1133. The jelly roll assembly 1 further includes bundling insulation patches 15 disposed on the third side surface 1132, the fourth side surface 1133, and the second end surface 1134. Two ends of each of the bundling insulation patches 15 respectively extend to two first side surfaces 112. The first side surface 112 and the second side surface 114 each have a larger surface area than each of a surface area of the third side surface 1132, a surface area of the fourth side surface 1133, a surface area of the first end surface 1131, and a surface area of the second end surface 1134. In the case where the at least one jelly roll 111 abuts against one another at one of the first side surface 112 or the second side surface 114 with a larger area, the two ends of each of the bundling insulation patches 15 respectively extend to the other one of the first side surface 112 or second side surface 114 of the at least one jelly roll 111. As illustrated by curve C in FIG. 5, under full charge/full discharge cycle at 1 C and 25° C., when the discharge capacity of the energy storage device 2 in which the bundling insulation patches 15 and the first insulation patch 13 are attached is attenuated to 90% of the rated capacity, the cycle number of the energy storage device 2 is equal to or larger than 900, and when the discharge capacity of the energy storage device 2 in which the bundling insulation patches 15 and the first insulation patch 13 are attached is attenuated to 80% of the rated capacity, the cycle number of the energy storage device 2 is equal to or larger than 1500.

Thus, since the electrode sheet 1111 of the energy storage device 2 may expand during charging and discharging, wrinkles may appear, and impregnation of the electrolyte at the wrinkles is difficult, which easily results in lithium plating and reduces the cycle number. The expansion of the electrode sheet 1111 can be effectively restrained by the bundling insulation patches 15, so that the electrode sheet 1111 can maintain a good fitting interface, thereby prolonging the service life. Specifically, referring to FIG. 5. under full charge/full discharge cycle at 1 C and 25° C., when the discharge capacity of the energy storage device 2 in which the bundling insulation patches 15 are attached is attenuated to 90% of the rated capacity, the cycle number of the energy storage device 2 is equal to or larger than 900, and when the discharge capacity of the energy storage device 2 in which the bundling insulation patches 15 are attached is attenuated to 80% of the rated capacity, the cycle number of the energy storage device 2 is equal to or less than 1500. As illustrated by curve C in FIG. 5, under full charge/full discharge cycle at 1 C and 25° C., when the discharge capacity of the energy storage device 2 in which both the bundling insulation patches 15 and the first insulation patch 13 are attached is attenuated to 90% of the rated capacity, the cycle number of the energy storage device 2 is equal to or larger than 900, and when the discharge capacity of the energy storage device 2 in which both the bundling insulation patches 15 and the first insulation patch 13 are attached is attenuated to 80% of the rated capacity, the cycle number of the energy storage device 2 is equal to or larger than 1500. Experiments show that, with either the first insulation patch 13 or the bundling insulation patches 15 alone, the service life of the energy storage device 2 can be prolonged. Moreover, with the aid of both the bundling insulation patches 15 and the first insulation patch 13, the service life of the energy storage device 2 can be further prolonged.

In the implementations, the bundling insulation patch 15 is a blue film adhesive. A main body of the blue film adhesive is made of PET, and glue of the blue film adhesive is acrylic glue. It is be appreciated that in other implementations, the bundling insulation patch 15 may be an insulating tape of other kinds and having a certain strength.

In an implementation, the thickness of the bundling insulation patch 15 is 30 μm. It can be understood that in other implementations, the thickness of the bundling insulation patch 15 may be, but is not limited to, 30 μm.

In an implementation, the bundling insulation patch 15 has a width ranging from 24 mm to 26 mm.

In an implementation, the bundling insulation patch 15 extends on the exposed first side surface 112 and/or the exposed second side surface 114 of the at least one jelly roll 111 by a distance of greater than or equal to 10 mm and less than or equal to 30 mm.

Figure 10:
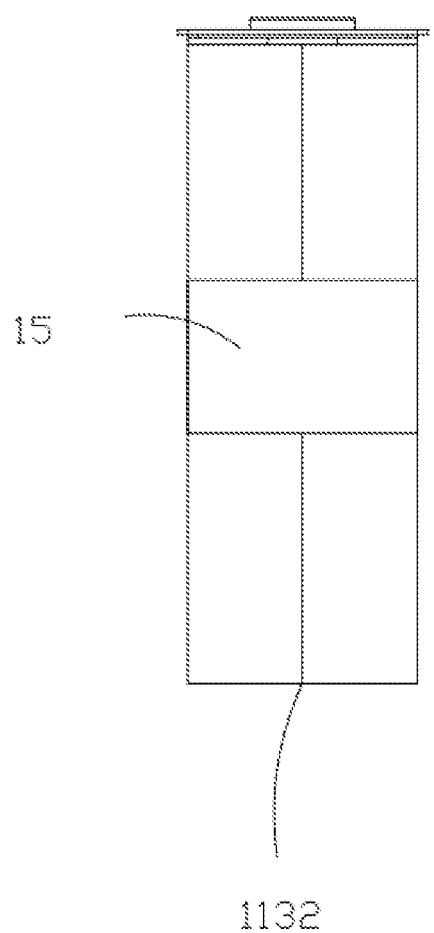
FIG. 10 is a left view of the energy storage device in FIG. 9 in an implementation of the disclosure.
Figure 11:
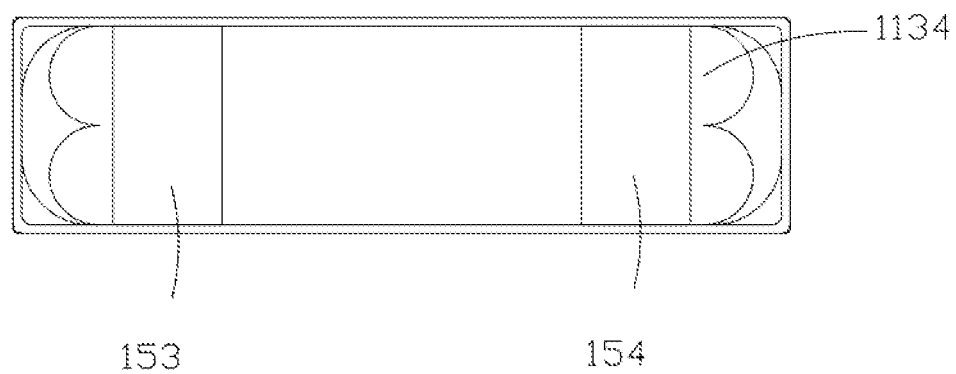
FIG. 11 is a bottom view of the energy storage device in FIG. 9 in an implementation of the disclosure.

Referring to FIG. 10 and FIG. 11 together, in the case where both the first tab 121 and the second tab 122 are disposed on the first end surface 1131, the bundling insulation patches 15 are disposed on the third side surface 1132, the fourth side surface 1133, and the second end surface 1134. Thus, the bundling insulation patch 15 can provide a pre-tightening force for the at least two jelly rolls 111, so that the at least one jelly roll 111 may not shake or move at the third side surface 1132, the fourth side surface 1133, and/or the second end surface 1134, which can effectively restrict the expansion of the electrode sheet 1111, maintain a good fitting interface of the electrode sheet 1111, and prolong the service life.

In other implementations, the first tab 121 and the second tab 122 are respectively disposed on the first end surface 1131 and the second end surface 1134, and in this case, the bundling insulation patch 15 is disposed on the third side surface 1132 and the fourth side surface 1133. The bundling insulation patch 15 may provide a pre-tightening force for the at least two jelly rolls 111, so that the at least one jelly roll 111 may not shake or move at the third side surface 1132 and the fourth side surface 1133, which can effectively restrict the expansion of the electrode sheet 1111, maintain a good fitting interface of the electrode sheet 1111, and prolong the service life. As to the first end surface 1131 and the second end surface 1134 sides, an end cover at a corresponding position can provide a pre-tightening force and a corresponding supporting force, thereby avoiding shaking or movement.

In an implementation, in the case where lengths of the third side surface 1132, the fourth side surface 1133, and the second end surface 1134 are different, the number of the bundling insulation patches 15 attached to each of the third side surface 1132, the fourth side surface 1133, and the second end surface 1134 is directly proportional to the length of the corresponding side surface.

In other words, the number of the bundling insulation patches 15 disposed on the third side surface 1132 is directly proportional to the length of the fourth side surface 1133, the number of the bundling insulation patches 15 disposed on the fourth side surface 1133 is directly proportional to the length of the fourth side surface 1133, and the number of the bundling insulation patches 15 disposed on the second end surface 1134 is directly proportional to the length of the second end surface 1134. In the case where the second end surface 1134 has a relatively large size in the width direction W, a relatively large number of the bundling insulation patches 15 are disposed on the second end surface 1134. On the contrary, in the case where the third side surface 1132 and the fourth side surface 1133 have a relatively small size in the height direction H, a relatively small number of the bundling insulation patches 15 are disposed on the third side surface 1132 and the fourth side surface 1133.

In an implementation, a length of the second end surface 1134 is greater than a length of the third side surface 1132 and a length of the fourth side surface 1133. At least two bundling insulation patches 15 are arranged at intervals on the second end surface 1134. At least one bundling insulation patch 15 is disposed at intervals on the fourth side surface 1133, for example, one bundling insulation patch 15 is centrally disposed on the fourth side surface 1133.

The second end surface 1134 has a relatively large size in the width direction W, thus at least two bundling insulation patches 15 are disposed on the second end surface 1134. On the contrary, the third side surface 1132 and the fourth side surface 1133 have a relatively small size in the height direction H, thus at least one bundling insulation patch 15 is disposed on each of the third side surface 1132 and the fourth side surface 1133. In this way, a balance in adhesive forces of different regions of the jelly roll 111 can be achieved.

In an implementation, referring to FIG. 1 and FIGS. 9-11 again, the at least one jelly roll 111 includes two jelly rolls 111. The two jelly rolls 111 abut against each other at two second side surfaces 114. The bundling insulation patches 15 include a first bundling insulation patch 151, a second bundling insulation patch 152, a third bundling insulation patch 153, and a fourth bundling insulation patch 154. The first bundling insulation patch 151 is disposed on the third side surface 1132 and has two ends respectively extending from the third side surface 1132 to two first side surfaces 112 that are exposed. The second bundling insulation patch 152 is disposed on the fourth side surface 1133 and has two ends respectively extending from the fourth side surface 1133 to the two first side surfaces 112 that are exposed. The third bundling insulation patch 153 and the fourth bundling insulation patch 154 are disposed on the second end surface 1134 at an interval. Furthermore, the third bundling insulation patch 153 has two ends respectively extending from the second end surface 1134 to the two first side surfaces 112 that are exposed. The fourth bundling insulation patch 154 has two ends respectively extending from the second end surface 1134 to the two first side surfaces 112 that are exposed. The first bundling insulation patch 151 and the second bundling insulation patch 152 are symmetrically arranged about a central line of the jelly roll 111. The third bundling insulation patch 153 and the fourth bundling insulation patch 154 are symmetrically arranged about the central line of the jelly roll 111.

In an implementation, in the width direction W of the jelly roll 111, the first bundling insulation patch 151 and the second bundling insulation patch 152 respectively extend on two exposed first side surfaces 112 by a distance of greater than or equal to 10 mm and less than or equal to 30 mm. In the height direction H of the jelly roll 111, the third bundling insulation patch 153 and the fourth bundling insulation patch 154 respectively extend on two exposed first side surfaces 112 by a distance of greater than or equal to 10 mm and less than or equal to 30 mm.

Thus, the first bundling insulation patch 151 is disposed on the third side surface 1132 of the jelly roll 111, the second bundling insulation patch 152 is disposed on the fourth side surface 1133 of the jelly roll 111, and the third bundling insulation patch 153 and the fourth bundling insulation patch 154 are disposed on the second end surface 1134 of the jelly roll 111, so that a more secure and balanced bundling can be achieved, thereby effectively restraining the expansion of the electrode sheet 1111, maintaining a good fitting interface, and prolonging the service life.

In an implementation, the third bundling insulation patch 153 is closer to the third side surface 1132 than the first insulation sub-patch 131, and the fourth bundling insulation patch 154 is closer to the fourth side surface 1133 than the second insulation sub-patch 132.

Thus, since the first insulation sub-patch 131 and the second insulation sub-patch 132 are closed to the center, and the third bundling insulation patch 153 and the fourth bundling insulation patch 154 are relatively closer to the fourth side surface 1133 and the third side surfaces 1132 opposite the fourth side surface 1133, it can prevent the jelly roll 111 from expanding or shaking at positions close to the fourth side surface 1133 and the third side surface 1132, so that the overall structure is more stable.

In an implementation, a ratio of a tensile force that the bundling insulation patches 15 are able to withstand to an adhering area of the bundling insulation patches 15 on the at least one jelly roll 111 is greater than an expansion-force pressure of the at least one jelly roll 111, where the expansion-force pressure of the at least one jelly roll 111 is less than or equal to 0.4 MPa.

Thus, the ratio of the tensile force that the bundling insulation patches 15 are able to withstand to the adhering area of the bundling insulation patches 15 on the at least one jelly roll 111 is greater than the expansion-force pressure of the at least one jelly roll 111, where the expansion-force pressure of the at least one jelly roll 111 is less than or equal to 0.4 MPa. When the at least one jelly roll 111 expands during charging and discharging, the bundling insulation patches 15 apply a pre-tightening force to restrain the expansion, so that an adhesion between the separator and the negative electrode sheet is better, which can prevent the separator and the negative electrode sheet from moving apart and forming wrinkles as a result of the expansion, thereby improving the entry effect of the electrolyte, reducing lithium plating, and prolonging the service life.

Figure 12:
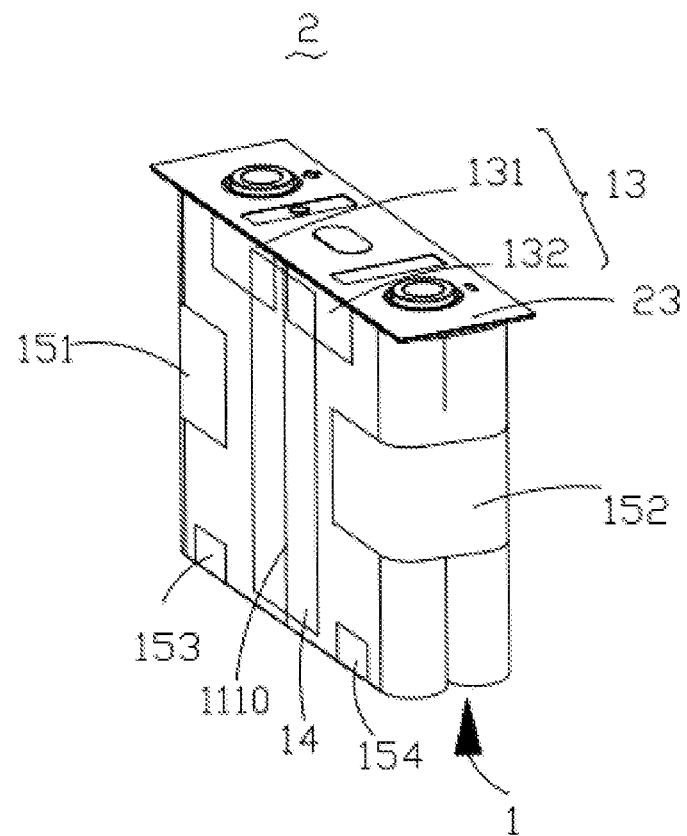
FIG. 12 is a schematic exploded view of an energy storage device in an implementation of the disclosure.
Figure 12:
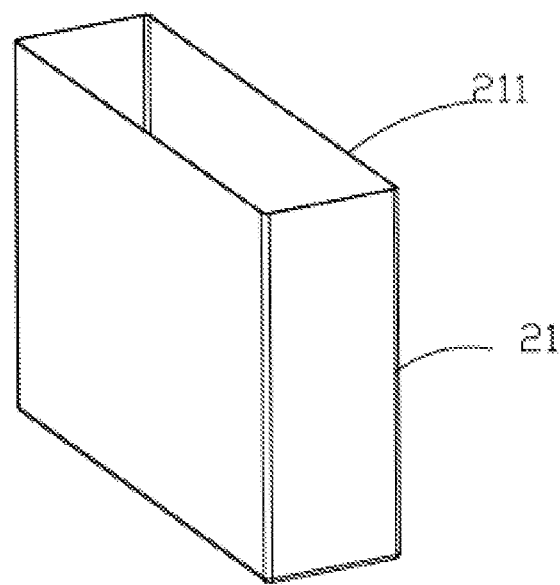
Figure 13:
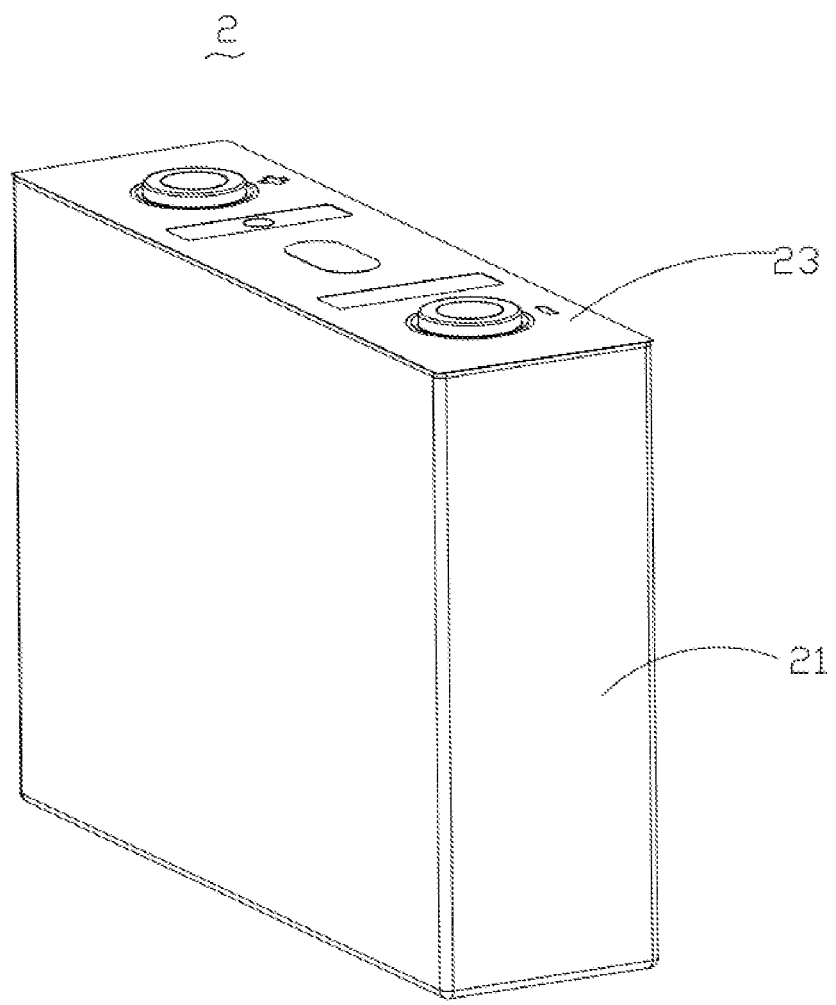
FIG. 13 is an assembly view of the energy storage device in FIG. 12 in an implementation of the disclosure.

Referring to FIG. 12 and FIG. 13, in an implementation, the energy storage device 2 further includes a casing 21 and a cover plate 23. The casing 21 defines an opening 211 at one side of the casing 21, the jelly roll assembly 1 is received in the casing 21, and the connector 22 is disposed on one side of the cover plate 23 facing the casing 21. The cover plate 23 covers the opening 211 of the casing 21 to define an accommodating space, and the jelly roll assembly 1 and the connector 22 are accommodated in the accommodating space.

In an implementations, the casing 21 is one of an aluminum housing, a steel housing, a stainless steel housing, etc.

In an implementations, the energy storage device 2 is one of a lithium iron phosphate battery, a pear acid battery, a lithium battery, etc.

In an implementation, the energy storage device 2 is a square-casing battery.

In an implementation, the energy storage device 2 may be, but is not limited to, a battery cell, a battery module, a battery pack, etc.

An electric device is further provided in the disclosure. The electric device includes the above-identified energy storage device 2, where the energy storage device 2 is configured for providing electric energy.

In the above implementations, description of each implementation has its own emphasis. For any specific part of an implementation is not described in detail, reference may be made to related descriptions of other implementations.

The above are implementations of the disclosure, it should be noted that for those of ordinary skill in the art, various improvements and modifications can also be made without departing from the principles of implementations of the disclosure. The various improvements and modifications are also considered to be within the scope of protection of the disclosure.

What is claimed is:

1. An energy storage device, comprising a jelly roll assembly and a connector, wherein the jelly roll assembly comprises at least one jelly roll, each of the at least one jelly roll is formed by winding an electrode sheet, the electrode sheet comprises a plurality of tabs, the plurality of tabs are arranged in a thickness direction of the tabs after winding the electrode sheet;
   after the winding, the jelly roll has a first side surface and a first end surface connected with the first side surface, the plurality of tabs are bent at roots of the plurality of tabs and attached to the first end surface, and the plurality of tabs have a connection surface away from the first end surface;
   the connector is disposed on the connection surface and connected with the plurality of tabs;
   the jelly roll assembly further comprises a first insulation patch, wherein the first insulation patch adheres to and covers a surface of the connector away from the first end surface, and is bent and extends to the first side surface;
   under full charge/full discharge cycle at 1 current (C) and 25° C., when a discharge capacity of the energy storage device in which the first insulation patch is attached is attenuated to 90% of a rated capacity of the energy storage device, a cycle number of the energy storage device is equal to or larger than 500, and when the discharge capacity of the energy storage device is attenuated to 80% of the rated capacity, the cycle number of the energy storage device is equal to or larger than 1200;
   the at least one jelly roll further has a second side surface opposite the first side surface;
   the plurality of tabs have an attachment surface close to the first end surface, the jelly roll assembly further comprises a second insulation patch, wherein the second insulation patch adheres to and covers the attachment surface and extends to the first end surface and the second side surface;
   the at least one jelly roll further has a third side surface, a fourth side surface opposite the third side surface, and a second end surface opposite the first end surface, wherein the first end surface is connected with one side of the first side surface, one side of the second side surface, one side of the third side surface, and one side of the fourth side surface, and the second end surface is connected with the other side of the first side surface, the other side of the second side surface, the other side of the third side surface, and the other side of the fourth side surface; the first side surface and the second side surface each have a greater area than the third side surface, the fourth side surface, the first end surface, and the second end surface; the jelly roll assembly further comprises bundling insulation patches disposed on the third side surface, the fourth side surface, and the second end surface, wherein when the at least one jelly roll abuts against one another at one of the second side surface or the first side surface, two ends of each of the bundling insulation patches respectively extend to the other one of the first side surface or the second side surface of the at least one jelly roll that is exposed; under full charge/full discharge cycle at 1 C and 25° C., when the discharge capacity of the energy storage device in which the bundling insulation patches and the first insulation patch are attached is attenuated to 90% of the rated capacity, the cycle number of the energy storage device is equal to or larger than 900 and when the discharge capacity of the energy storage device is attenuated to 80% of the rated capacity, the cycle number of the energy storage device is equal to or larger than 1500;

a ratio of a tensile force that the bundling insulation patches are able to withstand to an adhering area of the bundling insulation patches on the at least one jelly roll is greater than an expansion-force pressure of the at least one jelly roll, wherein the expansion-force pressure of the at least one jelly roll is less than or equal to 0.4 MPa;

the electrode sheet comprises a first electrode sheet and a second electrode sheet, wherein each of the at least one jelly roll is formed by winding the first electrode sheet and the second electrode sheet, the first electrode sheet comprises a plurality of first tabs, the second electrode sheet comprises a plurality of second tabs, the plurality of first tabs are arranged in a thickness direction of the plurality of first tabs after the winding, and the plurality of second tabs are arranged in a thickness direction of the plurality of second tabs after the winding, and a polarity of the plurality of first tabs is opposite to a polarity of the plurality of second tabs;

the connector comprises a first connector and a second connector;

the plurality of first tabs have a first connection surface away from the first end surface, wherein the first connector is disposed on the first connection surface and is connected with the plurality of first tabs; the plurality of second tabs have a second connection surface away from the first end surface, wherein the second connector is disposed on the second connection surface and is connected with the plurality of second tabs;

the first insulation patch comprises a first insulation sub-patch and a second insulation sub-patch, wherein the first insulation sub-patch adheres to and covers a surface of the first connector away from the first end surface and extends to the first side surface, and the second insulation sub-patch adheres to and covers a surface of the second connector away from the first end surface and extends to the first side surface;

the first insulation sub-patch comprises a first connection sub-portion and a second connection sub-portion connected with the first connection sub-portion, wherein the first connection sub-portion adheres to an upper side of the first end surface, and the second connection sub-portion is bent downwards relative to the first connection sub-portion and adheres to the first side surface; the second insulation sub-patch comprises a third connection sub-portion and a fourth connection sub-portion connected with the third connection sub-portion, wherein the third connection sub-portion adheres to the upper side of the first end surface, and the fourth connection sub-portion is bent downwards relative to the third connection sub-portion and adheres to the first side surface; and the first insulation sub-patch has an elongation at break of 120%-140% at a bending connection region between the first connection sub-portion and the second connection sub-portion when subject to an expansion force of the at least one jelly roll, and the second insulation sub-patch has an elongation at break of 120%-140% at a bending connection region between the third connection sub-portion and the fourth connection sub-portion when subject to the expansion force of the at least one jelly roll.

2. The energy storage device of claim 1, wherein in a width direction of the at least one jelly roll, the first connection sub-portion exceeds an edge of the first connector by a distance greater than or equal to 2 mm; a length of the second sub-connection portion in a height direction of the at least one jelly roll is greater than or equal to 2 mm; and
in the width direction of the at least one jelly roll, the third connection sub-portion exceeds an edge of the second connector by a distance greater than or equal to 2 mm, and a length of the fourth connection sub-portion in the height direction of the at least one jelly roll is greater than or equal to 2 mm.

3. The energy storage device of claim 1, wherein the first insulation sub-patch has a deformation ratio of 0-20% at a bending connection region between the first connection sub-portion and the second connection sub-portion when subject to an expansion force of the at least one jelly roll, and the second insulation sub-patch has a deformation ratio of 0-20% at a bending connection region between the third connection sub-portion and the fourth connection sub-portion when subject to the expansion force of the at least one jelly roll.

4. The energy storage device of claim 1, wherein
the plurality of first tabs have a first attachment surface close to the first end surface, and the plurality of second tabs have a second attachment surface close to the first end surface; and
the second insulation patch comprises a third insulation sub-patch and a fourth insulation sub-patch, wherein the third insulation sub-patch adheres to and covers the first attachment surface and extends to the first end surface and the second side surface, and the fourth insulation sub-patch adheres to and covers the second attachment surface and extends to the first end surface and the second side surface.

5. The energy storage device of claim 4, wherein in a width direction of the at least one jelly roll, the third insulation sub-patch exceeds an edge of the first attachment surface by a distance greater than or equal to 2 mm; in the width direction of the at least one jelly roll, the fourth insulation sub-patch exceeds an edge of the second attachment surface by a distance greater than or equal to 2 mm.

6. The energy storage device of claim 4, wherein in a height direction of the at least one jelly roll, the third insulation sub-patch extends on the second side surface by a distance greater than or equal to 2 mm; in the height direction of the at least one jelly roll, the fourth insulation sub-patch extends on the second side surface by a distance greater than or equal to 2 mm.

7. The energy storage device of claim 5, wherein in a height direction of the at least one jelly roll, the third insulation sub-patch extends on the second side surface by a distance greater than or equal to 2 mm; in the height direction of the at least one jelly roll, the fourth insulation sub-patch extends on the second side surface by a distance greater than or equal to 2 mm.

8. The energy storage device of claim 1, wherein the at least one jelly roll is provided with a tail portion on the first side surface, the jelly roll assembly further comprises a tail insulation patch, and the tail insulation patch adheres to and covers the first side surface and the tail portion.

9. The energy storage device of claim 8, wherein the tail insulation patch is between the first insulation sub-patch and the second insulation sub-patch.

10. The energy storage device of claim 9, wherein the tail insulation patch at least partially covers and adheres to at least one of the first insulation sub-patch or the second insulation sub-patch.

11. The energy storage device of claim 10, wherein the at least one jelly roll comprises two jelly rolls, wherein the two jelly rolls abut against each other at two second side surfaces, and the bundling insulation patches comprise a first bundling insulation patch, a second bundling insulation patch, a third bundling insulation patch, and a fourth bundling insulation patch, wherein the first bundling insulation patch is disposed on the third side surface and has two ends respectively extending from the third side surface to two first side surfaces that are exposed, and the second bundling insulation patch is disposed on the fourth side surface and has two ends respectively extending from the fourth side surface to the two first side surfaces that are exposed; the third bundling insulation patch and the fourth bundling insulation patch are disposed on the second end surface at an interval, wherein the third bundling insulation patch has two ends respectively extending from the second end surface to the two first side surfaces that are exposed, and the fourth bundling insulation patch has two ends respectively extending from the second end surface to the two first side surfaces that are exposed.

12. The energy storage device of claim 11, wherein the first bundling insulation patch and the second bundling insulation patch are symmetrically arranged about a central line of the at least one jelly roll, and the third bundling insulation patch and the fourth bundling insulation patch are symmetrically arranged about the central line of the at least one jelly roll.

13. The energy storage device of claim 1, wherein the first connector has a first connection region and a second connection region, wherein the first connection region is connected with the plurality of first tabs, and the first insulation sub-patch covers the first connection region and the second connection region is exposed; the second connector has a third connection region and a fourth connection region, wherein the third connection region is connected with the plurality of second tabs, and the second insulation sub-patch covers the third connection region and the fourth connection region is exposed.

14. The energy storage device of claim 13, wherein the jelly roll assembly further comprises a third insulation patch and a fourth insulation patch, wherein the third insulation patch adheres to and covers one side of the second connection region facing the first end surface, and the fourth insulation patch adheres to and covers one side of the fourth connection region facing the first end surface.

15. The energy storage device of claim 14, wherein the plurality of first tabs have a first attachment surface close to the first end surface, the plurality of second tabs have a second attachment surface close to the first end surface; the at least one jelly roll further has a second side surface opposite the first side surface; the jelly roll assembly further comprises a second insulation patch that comprises a third insulation sub-patch and a fourth insulation sub-patch, wherein the third insulation sub-patch adheres to and covers the first attachment surface and extends to the first end surface and the second side surface, and the fourth insulation sub-patch adheres to and covers the second attachment surface and extends to the first end surface and the second side surface; the third insulation patch extends from the second connection region to cover the first connection region and partially overlaps the third insulation sub-patch; and the fourth insulation patch extends from the fourth connection region to cover the third connection region and partially overlaps the fourth insulation sub-patch.

16. The energy storage device of claim 1, further comprising a casing and a cover plate, wherein the casing defines an opening at one side of the casing, the jelly roll assembly is received in the casing, the connector is disposed on one side of the cover plate facing the casing, and the cover plate covers the opening of the casing.

17. An electric device, comprising at least one energy storage device, wherein the energy storage device is configured for providing electric energy, wherein
the at least one energy storage device comprises a jelly roll assembly and a connector, wherein the jelly roll assembly comprises at least one jelly roll, each of the at least one jelly roll is formed by winding an electrode sheet, the electrode sheet comprises a plurality of tabs, the plurality of tabs are arranged in a thickness direction of the tabs after winding the electrode sheet;
after the winding, the jelly roll has a first side surface and a first end surface connected with the first side surface, the plurality of tabs are bent at roots of the plurality of tabs and attached to the first end surface, and the plurality of tabs have a connection surface away from the first end surface;
the connector is disposed on the connection surface and connected with the plurality of tabs;
the jelly roll assembly further comprises a first insulation patch, wherein the first insulation patch adheres to and covers a surface of the connector away from the first end surface, and is bent and extends to the first side surface;
under full charge/full discharge cycle at 1 current (C) and 25° C., when a discharge capacity of the energy storage device in which the first insulation patch is attached is attenuated to 90% of a rated capacity of the energy storage device, a cycle number of the energy storage device is equal to or larger than 500, and when the discharge capacity of the energy storage device is attenuated to 80% of the rated capacity, the cycle number of the energy storage device is equal to or larger than 1200;
the at least one jelly roll further has a second side surface opposite the first side surface;
the plurality of tabs have an attachment surface close to the first end surface, the jelly roll assembly further comprises a second insulation patch, wherein the second insulation patch adheres to and covers the attachment surface and extends to the first end surface and the second side surface;
the at least one jelly roll further has a third side surface, a fourth side surface opposite the third side surface, and a second end surface opposite the first end surface, wherein the first end surface is connected with one side of the first side surface, one side of the second side surface, one side of the third side surface, and one side of the fourth side surface, and the second end surface is connected with the other side of the first side surface, the other side of the second side surface, the other side of the third side surface, and the other side of the fourth side surface; the first side surface and the second side surface each have a greater area than the third side surface, the fourth side surface, the first end surface, and the second end surface; the jelly roll assembly further comprises bundling insulation patches disposed on the third side surface, the fourth side surface, and the second end surface, wherein when the at least one jelly roll abuts against one another at one of the second side surface or the first side surface, two ends of each of the bundling insulation patches respectively extend to the other one of the first side surface or the second side surface of the at least one jelly roll that is exposed; under full charge/full discharge cycle at 1 C and 25° C., when the discharge capacity of the energy storage device in which the bundling insulation patches and the first insulation patch are attached is attenuated to 90% of the rated capacity, the cycle number of the energy storage device is equal to or larger than 900, and when the discharge capacity of the energy storage device is attenuated to 80% of the rated capacity, the cycle number of the energy storage device is equal to or larger than 1500;

a ratio of a tensile force that the bundling insulation patches are able to withstand to an adhering area of the bundling insulation patches on the at least one jelly roll is greater than an expansion-force pressure of the at least one jelly roll, wherein the expansion-force pressure of the at least one jelly roll is less than or equal to 0.4 MPa;

the electrode sheet comprises a first electrode sheet and a second electrode sheet, wherein each of the at least one jelly roll is formed by winding the first electrode sheet and the second electrode sheet, the first electrode sheet comprises a plurality of first tabs, the second electrode sheet comprises a plurality of second tabs, the plurality of first tabs are arranged in a thickness direction of the plurality of first tabs after the winding, and the plurality of second tabs are arranged in a thickness direction of the plurality of second tabs after the winding, and a polarity of the plurality of first tabs is opposite to a polarity of the plurality of second tabs;

the connector comprises a first connector and a second connector;

the plurality of first tabs have a first connection surface away from the first end surface, wherein the first connector is disposed on the first connection surface and is connected with the plurality of first tabs; the plurality of second tabs have a second connection surface away from the first end surface, wherein the second connector is disposed on the second connection surface and is connected with the plurality of second tabs;

the first insulation patch comprises a first insulation sub-patch and a second insulation sub-patch, wherein the first insulation sub-patch adheres to and covers a surface of the first connector away from the first end surface and extends to the first side surface, and the second insulation sub-patch adheres to and covers a surface of the second connector away from the first end surface and extends to the first side surface;

the first insulation sub-patch comprises a first connection sub-portion and a second connection sub-portion connected with the first connection sub-portion, wherein the first connection sub-portion adheres to an upper side of the first end surface, and the second connection sub-portion is bent downwards relative to the first connection sub-portion and adheres to the first side surface; the second insulation sub-patch comprises a third connection sub-portion and a fourth connection sub-portion connected with the third connection sub-portion, wherein the third connection sub-portion adheres to the upper side of the first end surface, and the fourth connection sub-portion is bent downwards relative to the third connection sub-portion and adheres to the first side surface; and the first insulation sub-patch has an elongation at break of 120%-140% at a bending connection region between the first connection sub-portion and the second connection sub-portion when subject to an expansion force of the at least one jelly roll, and the second insulation sub-patch has an elongation at break of 120%-140% at a bending connection region between the third connection sub-portion and the fourth connection sub-portion when subject to the expansion force of the at least one jelly roll.

18. The electric device of claim 17, wherein in a width direction of the at least one jelly roll, the first connection sub-portion exceeds an edge of the first connector by a distance greater than or equal to 2 mm; a length of the second sub-connection portion in a height direction of the at least one jelly roll is greater than or equal to 2 mm; and in the width direction of the at least one jelly roll, the third connection sub-portion exceeds an edge of the second connector by a distance greater than or equal to 2 mm, and a length of the fourth connection sub-portion in the height direction of the at least one jelly roll is greater than or equal to 2 mm.

19. The electric device of claim 17, wherein the first insulation sub-patch has a deformation ratio of 0-20% at a bending connection region between the first connection sub-portion and the second connection sub-portion when subject to an expansion force of the at least one jelly roll, and the second insulation sub-patch has a deformation ratio of 0-20% at a bending connection region between the third connection sub-portion and the fourth connection sub-portion when subject to the expansion force of the at least one jelly roll.

20. The electric device of claim 17, wherein the plurality of first tabs have a first attachment surface close to the first end surface, and the plurality of second tabs have a second attachment surface close to the first end surface; and the second insulation patch comprises a third insulation sub-patch and a fourth insulation sub-patch, wherein the third insulation sub-patch adheres to and covers the first attachment surface and extends to the first end surface and the second side surface, and the fourth insulation sub-patch adheres to and covers the second attachment surface and extends to the first end surface and the second side surface.

* * * * *